US010522913B2

(12) United States Patent
Won et al.

(10) Patent No.: US 10,522,913 B2
(45) Date of Patent: Dec. 31, 2019

(54) ANTENNA MODULE

(71) Applicant: WITS Co., Ltd., Yongin-si, Gyeonggi-do (KR)

(72) Inventors: Jae Sun Won, Suwon-si (KR); Hee Seung Kim, Suwon-si (KR); Young Min Cheon, Suwon-si (KR); Gie Hyoun Kweon, Suwon-si (KR); Jae Hyuk Jang, Suwon-si (KR); Ki Won Chang, Suwon-si (KR); Chang Hee Lee, Suwon-si (KR); Hyo Jung Yoon, Suwon-si (KR); Young Seung Roh, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/835,708

(22) Filed: Dec. 8, 2017

(65) Prior Publication Data
US 2019/0027826 A1 Jan. 24, 2019

(30) Foreign Application Priority Data

Jul. 20, 2017 (KR) .................. 10-2017-0091900

(51) Int. Cl.
H04B 7/00 (2006.01)
H01Q 7/06 (2006.01)
H04B 5/00 (2006.01)
H01Q 1/38 (2006.01)

(52) U.S. Cl.
CPC ............... *H01Q 7/06* (2013.01); *H01Q 1/38* (2013.01); *H04B 5/0031* (2013.01); *H04B 5/0081* (2013.01)

(58) Field of Classification Search
CPC ....... H01Q 1/38; H04B 5/0031; H04B 5/0081
USPC .................... 455/41.1, 41.2, 41.3
See application file for complete search history.

(56) References Cited

U.S. PATENT DOCUMENTS

| 7,712,672 | B2* | 5/2010 | Takahashi | G06K 7/10336 |
| | | | | 235/492 |
| 2007/0051807 | A1* | 3/2007 | Yamaguchi | G06K 7/0008 |
| | | | | 235/451 |
| 2010/0309081 | A1* | 12/2010 | Kobayashi | G06K 7/10316 |
| | | | | 343/788 |
| 2012/0091821 | A1* | 4/2012 | Kato | H01Q 1/38 |
| | | | | 307/104 |
| 2012/0098711 | A1* | 4/2012 | Yosui | G06K 7/10336 |
| | | | | 343/702 |

(Continued)

FOREIGN PATENT DOCUMENTS

| JP | 2013-146050 A | 7/2013 |
| JP | 5641152 B2 | 12/2014 |

(Continued)

*Primary Examiner* — Md K Talukder
(74) *Attorney, Agent, or Firm* — Harness, Dickey & Pierce, P.L.C.

(57) ABSTRACT

An antenna module includes a coil part including a second antenna wiring disposed in a spiral shape on an insulating substrate and a first antenna wiring disposed in an internal region of the second antenna wiring; and a magnetic part including a second magnetic part disposed on a second surface of the insulating substrate and a first magnetic part extending from the second magnetic part, penetrating through the internal region of the second antenna wiring, and disposed on a first surface of the insulating substrate.

19 Claims, 27 Drawing Sheets

(56) References Cited

U.S. PATENT DOCUMENTS

| | | | | |
|---|---|---|---|---|
| 2013/0147670 A1* | 6/2013 | Nakano | ................ | H01Q 1/243 |
| | | | | 343/702 |
| 2014/0145906 A1* | 5/2014 | Kato | ..................... | H01Q 7/00 |
| | | | | 343/867 |
| 2014/0176382 A1* | 6/2014 | Nakano | ................ | H01Q 1/243 |
| | | | | 343/788 |
| 2014/0191916 A1* | 7/2014 | Ito | ........................ | H01Q 7/06 |
| | | | | 343/788 |
| 2015/0077296 A1* | 3/2015 | An | ........................ | H01P 11/00 |
| | | | | 343/720 |
| 2015/0236418 A1* | 8/2015 | Ito | ........................ | H01Q 7/06 |
| | | | | 343/788 |
| 2015/0318609 A1* | 11/2015 | Tomonari | ............ | H01Q 1/243 |
| | | | | 343/788 |
| 2017/0040105 A1* | 2/2017 | Peralta | ................. | H01Q 7/00 |
| 2017/0040696 A1* | 2/2017 | Peralta | ................. | H01F 38/14 |
| 2018/0189627 A1* | 7/2018 | Kwon | ............ | G06K 19/07779 |
| 2018/0212475 A1* | 7/2018 | Noh | .................... | H01F 38/14 |
| 2018/0277954 A1* | 9/2018 | Lee | ..................... | H01Q 1/38 |
| 2018/0287258 A1* | 10/2018 | Kim | .................... | H01Q 7/06 |
| 2019/0027826 A1* | 1/2019 | Won | ..................... | H01Q 7/06 |

FOREIGN PATENT DOCUMENTS

| | | | |
|---|---|---|---|
| JP | 2015-32840 | A | 2/2015 |
| JP | 5817950 | B2 | 11/2015 |

\* cited by examiner

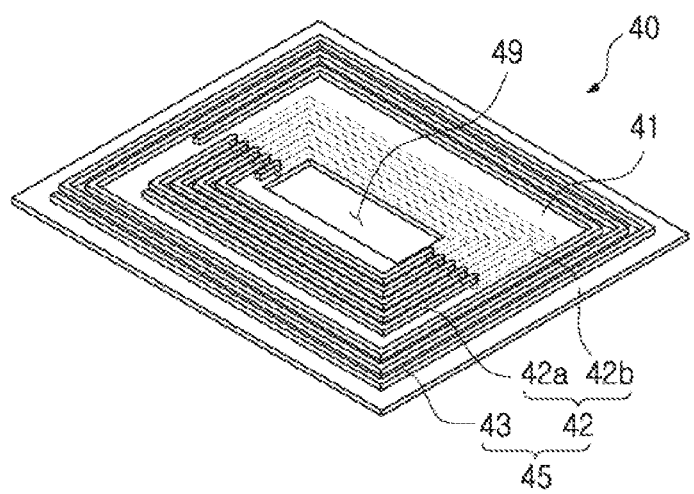
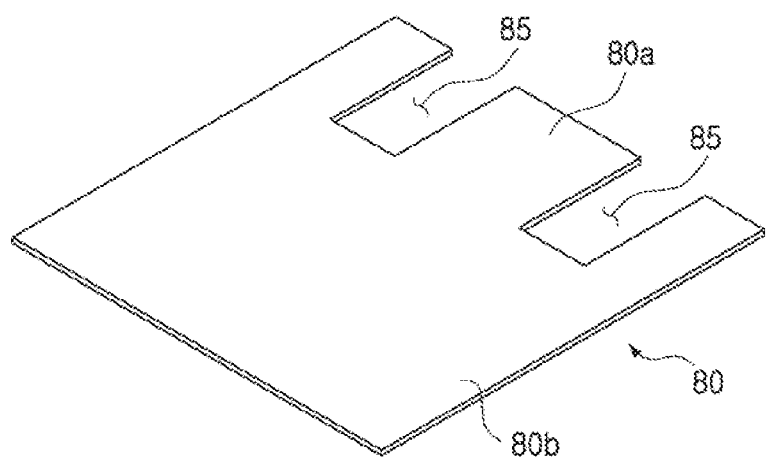
FIG. 6

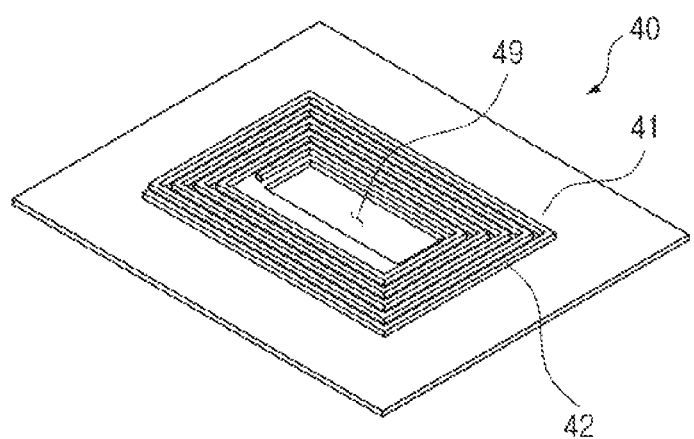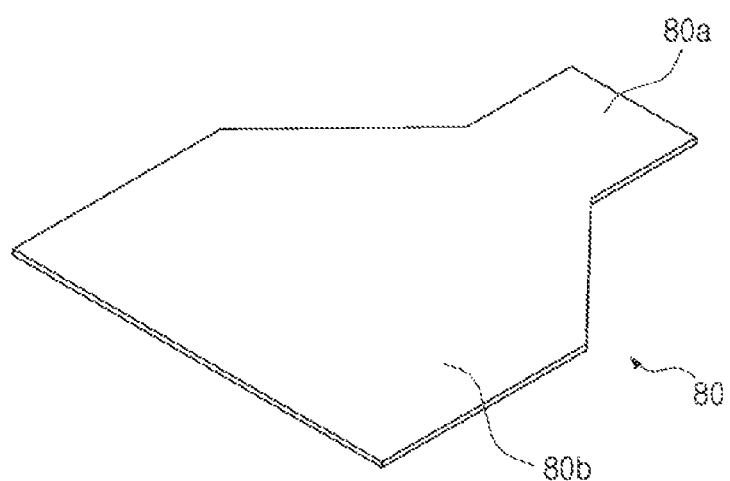
FIG. 17

ANTENNA MODULE

CROSS-REFERENCE TO RELATED APPLICATION(S)

This application claims benefit under 35 USC § 119(a) of Korean Patent Application No. 10-2017-0091900 filed on Jul. 20, 2017 in the Korean Intellectual Property Office, the entire disclosure of which is incorporated herein by reference for all purposes.

BACKGROUND

1. Field

The description relates to an antenna module mounted in an electronic device and is used for short-range communications.

2. Description of Related Art

As portable terminals such as smartphones become widespread and functions thereof are improved, a payment method using the short-range communications function of portable terminals has emerged. However, since a data transmission channel may not be present between a POS terminal conventionally and commonly installed in a store or the like and smartphones, payments using smartphones face many obstacles. In order to overcome such obstacles, methods using a 2D barcode or near field communication (NFC) have been proposed.

In addition, a magnetic secure transmission (MST) method capable of performing payments without adding a separate reading apparatus to a POS terminal has recently been proposed.

Thereby, both an NFC antenna and an MST antenna may be mounted in a single one portable terminal, and accordingly, an antenna module capable of maintaining communications performance of the respective antennas in the portable terminal is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an antenna module includes a coil part including a second antenna wiring disposed in a spiral shape on an insulating substrate, and a first antenna wiring disposed in an internal region of the second antenna wiring, and a magnetic part including a second magnetic part disposed on a second surface of the insulating substrate and a first magnetic part extending from the second magnetic part, and penetrating through an internal region of the second antenna wiring and disposed on a first surface of the insulating substrate.

The first magnetic part may be disposed in the internal region of the second antenna wiring and to face a portion of the first antenna wiring.

The first antenna wiring may include a first pattern disposed on the first surface of the insulating substrate, a second pattern disposed on the second surface of the insulating substrate, and interlayer connection conductors penetrating through the insulating substrate and connecting the first pattern and the second pattern with each other.

The first magnetic part may penetrate through a center region of the first antenna wiring.

The first magnetic part may penetrate through a region between the first antenna wiring and the second antenna wiring.

A portion of the first magnetic part may be disposed to overlap with the second magnetic part.

The magnetic part may include a cutting part that partially separates the magnetic part into the first magnetic part and the second magnetic part.

A portion of the cutting part may face the first antenna wiring.

The first antenna wiring may include a first wiring and a second wiring disposed to be spaced apart from each other, and the first magnetic part may be coupled to the coil part and may penetrate through both a center of the first wiring and a center of the second wiring.

The magnetic part may further comprise a third magnetic part disposed on the second surface of the insulating substrate and spaced apart from the second magnetic part.

The third magnetic part may be disposed to face the second antenna wiring.

The first antenna wiring may include two spiral parts disposed to be spaced apart from each other in an internal region of the second antenna wiring.

The two spiral parts may spiral in directions which are opposite to each other.

Any one of the two spiral parts may be disposed in a region inside a second spiral turn of the second antenna wiring.

A third antenna wiring may be disposed on the first surface of the insulating substrate and in an external or internal region of the second antenna wiring, wherein the second magnetic part may be configured such that a portion of the second magnetic part faces the third antenna wiring.

In another general aspect, an antenna module includes a coil part comprising a second antenna wiring and a first antenna wiring disposed in an internal region of the second antenna wiring, and a magnetic part disposed on one surface of the coil part to face the second antenna wiring, wherein a portion of the magnetic part extends to the other surface of the coil part and is disposed to face the first antenna wiring.

In one general aspect, an electronic device includes a case including an antenna module including a coil part including a second antenna wiring disposed in a spiral shape on an insulating substrate, and a first antenna wiring disposed in an internal region of the second antenna wiring, and a magnetic part including a second magnetic part disposed on a second surface of the insulating substrate and a first magnetic part extending from the second magnetic part, and penetrating through an internal region of the second antenna wiring and disposed on a first surface of the insulating substrate.

The electronic device may include a cell phone, a tablet personal computer, or a wearable electronic device.

Other features and aspects will be apparent from the following detailed description, the drawings, and the claims.

BRIEF DESCRIPTION OF DRAWINGS

FIG. 6 is an exploded perspective view of FIG. 5.

FIGS. 15 through 18 are exploded perspective views each of an antenna module according to an embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
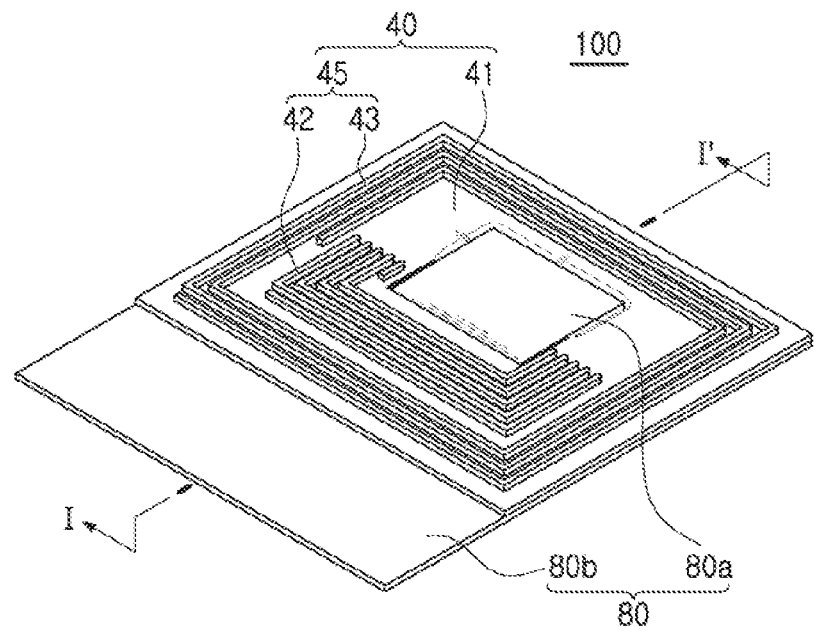
FIG. 1 is a perspective view schematically illustrating an antenna module according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
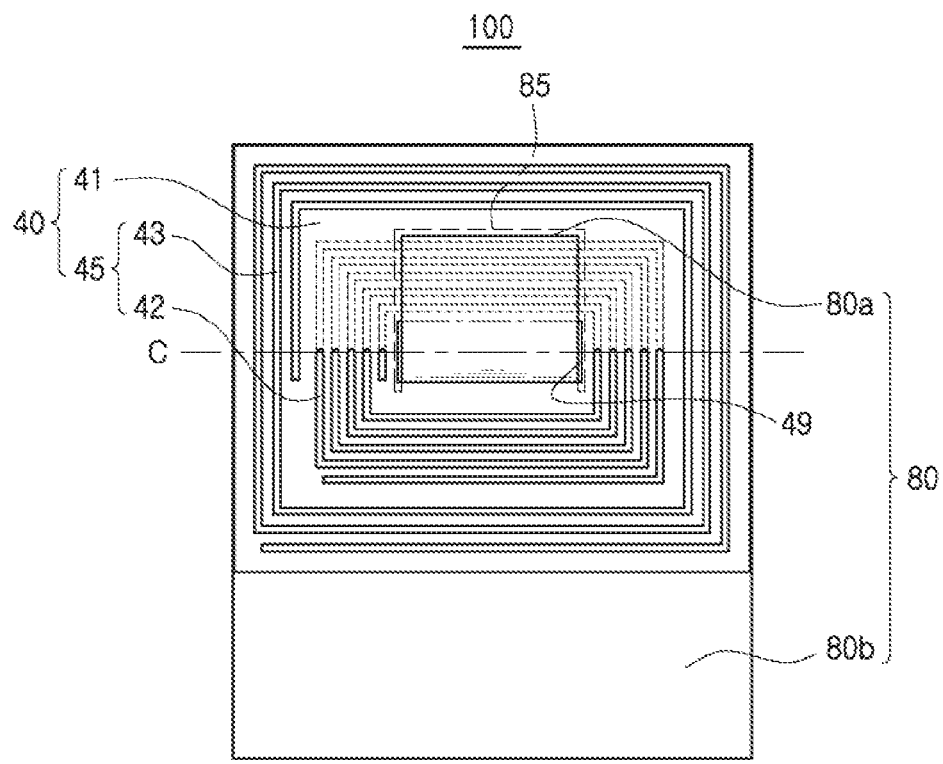
FIG. 2 is a plan view of the antenna module illustrated in FIG. 1.
Figure 3:
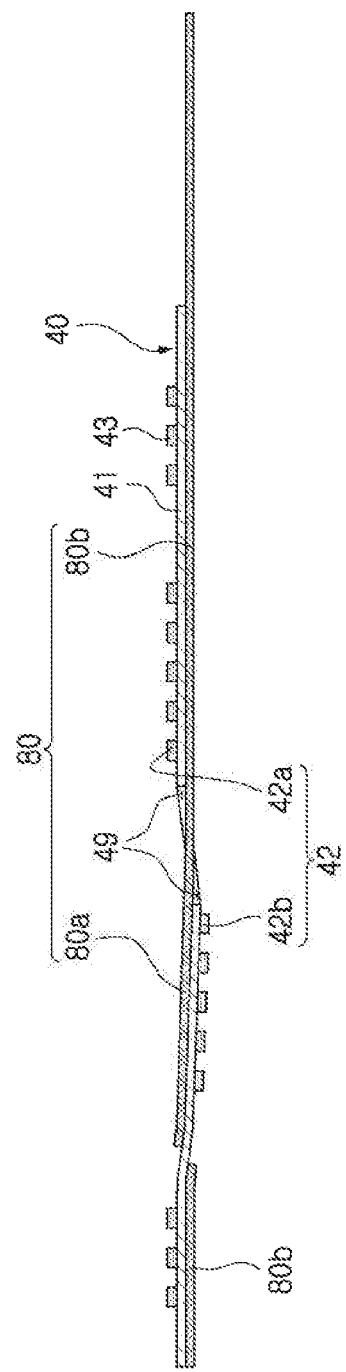
FIG. 3 is a cross-sectional view taken along a line I-I' of FIG. 1.
Figure 4:
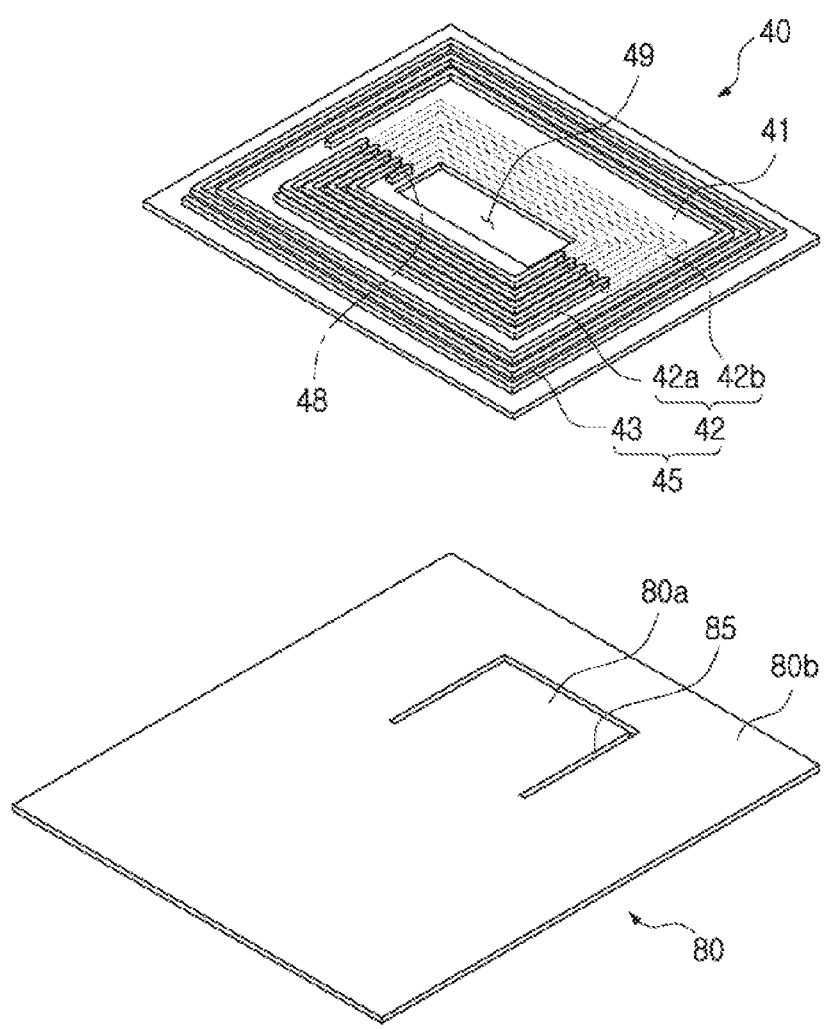
FIG. 4 is an exploded perspective view of the antenna module shown in FIG. 1.

FIG. 1 is a perspective view of an antenna module according to an embodiment, FIG. 2 is a plan view of the antenna module illustrated in FIG. 1, and FIG. 3 is a cross-sectional view taken along a line I-I' of FIG. 1. FIG. 4 is an exploded perspective view of the antenna module of FIG. 1.

Referring to FIGS. 1 through 4, an antenna module 100 according to an embodiment, an antenna module mounted in an electronic device and is used for short-range communications, includes a coil part 40 and a magnetic part 80.

The coil part 40 may have a form of a substrate. In more detail, the coil part 40 includes an insulating substrate 41, and an antenna wiring 45 formed on the insulating substrate 41.

The insulating substrate 41 refers to a substrate wherein a circuit wiring is formed on one surface or opposite surfaces thereof, and for example, an insulating film (e.g., a polyimide film) may be used. In this case, the coil part 40 has a form of a flexible printed circuit board (PCB). However, the wiring part 40 is not limited thereto, but various kinds of substrates (e.g., a printed circuit board, a ceramic substrate, a glass substrate, an epoxy substrate, a flexible substrate, and the like) which are known in the art may be used as long as the circuit wiring may be formed on the opposite surfaces thereof.

The antenna wiring 45 is formed on opposite surfaces of the insulating substrate 41 and has a form of circuit wiring formed of a copper foil, or the like.

The antenna wiring 45 according to an embodiment may be manufactured by patterning double sided copper clad laminates (CCL). In addition, the antenna wiring 43 may be formed by performing a photolithography method for the opposite surfaces of a flexible insulating substrate such as a film, and the coil part 40 may be manufactured for example in the flexible PCB (FPCB) having a double sided structure.

Accordingly, the coil part 40 according to an embodiment may have a thickness which is very thin. However, the wiring part 40 may be manufactured in a multilayer substrate, or may also be manufactured in a form of the printed circuit board (PCB) having rigidity, as needed.

The antenna wiring 45 is formed in a form in which the antenna wiring 45 protrudes from the insulating substrate 41, not a form in which the antenna wiring 45 is embedded in the insulating substrate 41. In this case, a distance at which the antenna wiring 45 protrudes from the insulating substrate 41 is similar to or the same as a thickness of a magnetic part 80 to be described below. However, the antenna wiring 45 is not limited thereto.

Further, the antenna wiring 45 may be formed of a single line coil, or may be formed of a coil of a Litz wire form formed of several strands.

The antenna wiring 45 according to an embodiment includes a first antenna wiring 42 and a second antenna wiring 43. Each of the first antenna wiring 42 and the second antenna wiring 43 is formed as a wiring having a spiral shape.

The first antenna wiring 42 includes a first pattern 42a disposed on a first surface of the insulating substrate 41, a second pattern 42b disposed on a second surface, the other surface of the insulating substrate 41, and interlayer connection conductors 48 that connect the first pattern 42a and the second pattern 42b with each other. The interlayer connection conductors 48 are disposed in the insulating substrate 41 so as to penetrate through the insulating substrate 41, and electrically connect the first pattern 42a and the second pattern 42b.

When the insulating substrate 41 is divided based on a dividing line C of FIG. 2, the first pattern 42a is disposed on one side of the insulating substrate 41 and the second pattern 42b is disposed on the other side of the insulating substrate 41. In addition, the interlayer connection conductors 48 are disposed along the dividing line C. Here, the dividing line C is defined as a line that connects the interlayer connection conductors 48 with each other.

Accordingly, a continuous spiral shape of the first antenna wiring 42 is completed by the first pattern 42a, the second pattern 42b, and the interlayer connection conductors 48. In addition, the first antenna wiring 42 is formed in a spiral shape in which a half of a turn of the first antenna wiring 42 is alternately disposed on the first surface and the second surface of the insulating substrate 41.

The first pattern 42a and the second pattern 42b each include linear patterns which are disposed in parallel. The linear patterns may be disposed to have concentricity.

The linear patterns of the first pattern 42a are each connected to the linear patterns of the second pattern 42b through the interlayer connection conductors 48. Therefore, one linear pattern of the first pattern 42a and one linear pattern of the second pattern 42b are connected to each other through the interlayer connection conductor 48 to form one coil turn.

By such an antenna structure, a half of the first antenna wiring 42 is disposed on the first surface of the insulating substrate 41, and the remaining half thereof is disposed on the second surface of the insulating substrate 41.

An overall contour of the first antenna wiring 42 may be an annular shape (or a ring shape). Therefore, an empty region in which the first antenna wiring 42 is not formed may be formed at a center of the first antenna wiring 42. Hereinafter, a center region of the first antenna wiring 42 refers to an empty region disposed at the center of an internal region of the first antenna wiring 42 and does not have the first antenna wiring 42 formed therein.

The first antenna wiring 42 configured as described above may be used as a magnetic secure transmission (MST) antenna. However, the first antenna wiring 42 is not limited thereto.

The second antenna wiring 43 is disposed on the first surface of the insulating substrate 41, and may be entirely exposed to the outside of a magnetic part 80 to be described below. However, the second antenna wiring 43 is not limited thereto, but may be disposed on the second surface of the insulating substrate 41 or disposed to be distributed on the opposite surfaces of the insulating substrate 41 similarly to the first antenna wiring 42 as needed.

The second antenna wiring 43 is disposed along an outer portion of the insulating substrate 41. In addition, an overall contour of the second antenna wiring 43 may be an annular shape (or a ring shape). Therefore, an empty region in which the second antenna wiring 43 is not formed may be formed at a center of the second antenna wiring 43. Hereinafter, a center region of the second antenna wiring 43 refers to a region disposed at the center of the internal region of the second antenna wiring 43 and does not have the second antenna wiring 43 formed therein.

The first antenna wiring 42 is disposed in the center region of the second antenna wiring 43. Therefore, the second antenna wiring 43 may be disposed on an outer side of the first antenna wiring 42 so as to accommodate the first antenna wiring 42 therein.

The second antenna wiring 43 may be used as a near field communication (NFC) antenna. However, the second antenna wiring 43 is not limited thereto.

Further, the coil part 40 according to an embodiment has a through-hole 49 formed in the center region of the first antenna wiring 42. The through-hole 49 penetrates through the insulating substrate 41 and is formed in the entirety of the center region of the first wiring 42 or may have a size smaller than the center region of the first antenna wiring 42. A first magnetic part 80a to be described below may be inserted into the through-hole 49.

The magnetic part 80 is used as a magnetic path of a magnetic field generated by the antenna wiring 45 of the coil part 40, and is provided to efficiently form the magnetic path of the magnetic field. To this end, the magnetic part 80 is formed of a material capable of easily forming the magnetic path, and for example, a material having permeability such as a ferrite, a nanocrystal magnetic material, an amorphous magnetic material, a silicon steel plate, or the like may be used.

The magnetic part 80 may be formed in a flat plate shape such as a sheet and may be disposed on opposite surfaces of the coil part 40, respectively.

In more detail, the magnetic part 80 may be formed in one body and include a cutting part 85 that partially cuts the magnetic part 80 and separates it into a first magnetic part 80a and a second magnetic part 80b.

Figure 8:
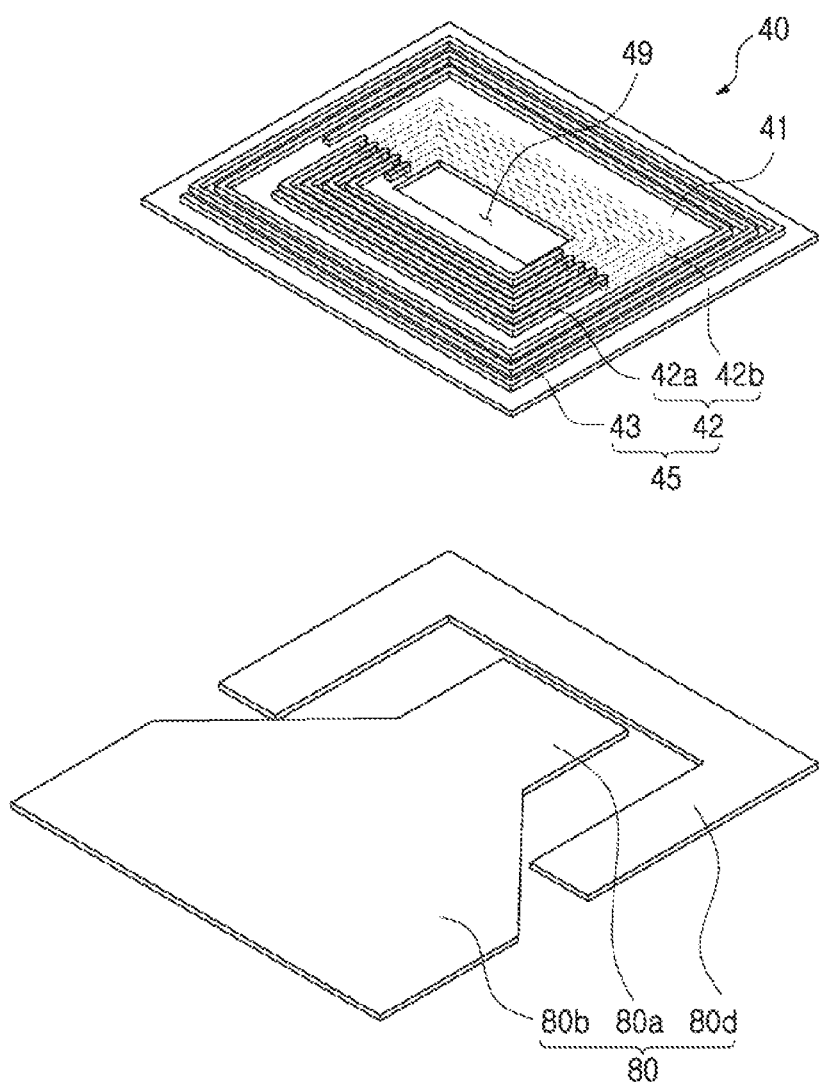
FIG. 8 is an exploded perspective view of FIG. 7.

In the description, a portion of the magnetic part 80 disposed on one surface of the coil part 40 (e.g., the first surface of the insulating substrate) may be defined as the first magnetic part 80a, and a portion of the magnetic part 80 disposed on the other surface of the coil part 40 (e.g., the second surface of the insulating substrate) may be defined as the second magnetic part 80b. Further, the magnetic part disposed on the other surface of the coil part 40 and is separated from the second magnetic part 80b is defined as a third magnetic part 80d (FIG. 8).

In an embodiment, the cutting part 85 is formed in a slit form and has a shape of 'ㄷ' in the magnetic part 80.

Therefore, according to an embodiment, a portion positioned inside the cutting part 85 may be defined as the first magnetic part 80a and a portion positioned outside the cutting part 85 may be defined as the second magnetic part 80b.

Figure 20:
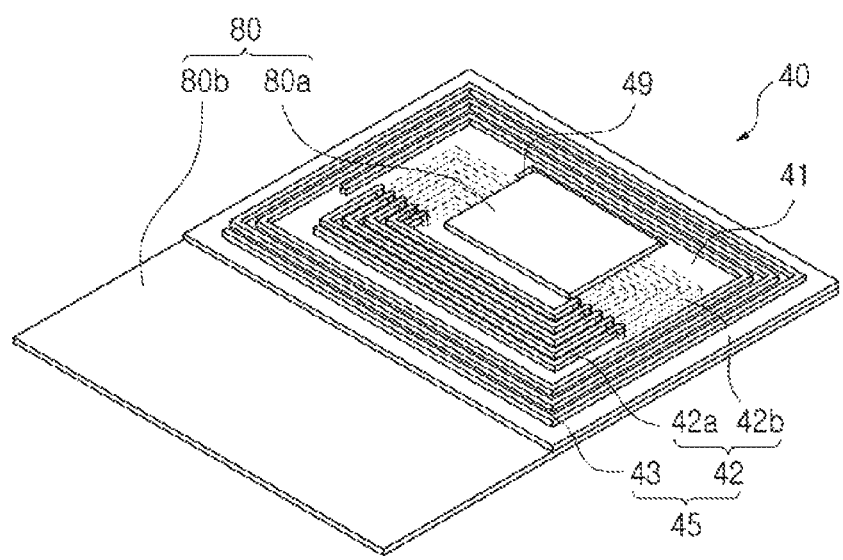
FIG. 20 is a perspective view of an antenna module according to an embodiment.

The first magnetic part 80a is disposed to protrude to the outside of the magnetic part 80 from the center of the magnetic part 80. A structure of the first magnetic part 80a may be defined according to an arrangement structure of the through-hole 49 and the first antenna wiring 42 included in the coil part 40, and as illustrated in FIG. 20, when a position of the through-hole 49 is changed, the arrangement structure of the first magnetic part 80a may also be changed.

The second magnetic part 80b may be disposed on the other surface of the coil part 40 (e.g., the second surface of the insulating substrate) and support the insulating substrate 41 as a whole. In addition, the first magnetic part 80a may extend from the second magnetic part 80b, penetrate through the through-hole 49 of the coil part 40, and be disposed on one surface of the coil part 40 (e.g., the first surface of the insulating substrate).

Therefore, a maximum width of the first magnetic part 80a may be the same as a width of the through-hole 49 or smaller than the width of the through-hole 49, and accordingly, the antenna module 100 according to the present exemplary embodiment has the first magnetic part 80a and the second magnetic part 80b which have different sizes. In detail, the second magnetic part 80b has a wider width and a wider area than the first magnetic part 80a.

According to an embodiment, both the first magnetic part 80a and the second magnetic part 80b are disposed on a region in which the antenna wiring 42 is not formed.

In more detail, both the first magnetic part 80a and the first pattern 42a are disposed on the first surface of the insulating substrate 41, and the first magnetic part 80a is disposed on a region in which the first pattern 42a is not formed, so as not to overlap the first pattern 42a.

Similarly, both the second magnetic part 80b and the second pattern 42b are disposed on the second surface of the insulating substrate 41, and the second magnetic part 80b is disposed on a region in which the second pattern 42b is not formed, so as not to overlap the second pattern 42b.

The entirety of the first magnetic part 80a may be disposed in a center region of the second antenna wiring 43, so as to expose the second antenna wiring 43. Further, the first magnetic part 80a may be disposed on a region between the first pattern 42a and the second antenna wiring 43 and may not be disposed so as to be in contact with the second antenna wiring 43 or to overlap the second antenna wiring 43. Therefore, the first magnetic part 80a may be disposed to be spaced apart from the first pattern 42a and the second antenna wiring 43 by a predetermined distance. "Spaced apart" by a "predetermined distance" generally means that the relevant parts are not in contact with each other.

The first magnetic part 80a and the second magnetic part 80b may be each disposed to face the first antenna wiring 42 while having the insulating substrate 41 interposed therebetween. In more detail, the first magnetic part 80a is disposed to face at least a portion of the second pattern 42b formed on the second surface of the insulating substrate 41.

In addition, the second magnetic part 80b is disposed to face at least a portion of the first pattern 42a formed on the first surface of the insulating substrate 41 and at least a portion of the second antenna wiring 43 disposed around the first pattern 42a.

Meanwhile, the antenna module 100 according to an embodiment may have an adhesive member (not shown) interposed between the coil part 40 and the magnetic part 80 so that the coil part 40 and the magnetic part 80 are firmly fixed and adhered to each other.

The adhesive member may be disposed between the coil part 40 and the magnetic part 80 and bonds the magnetic part 80 and the coil part 40 to each other. As such an adhesive member, an adhesive sheet or an adhesive tape may be used, and the adhesive member may also be formed by coating a surface of the coil part 40 or the magnetic part 80 with an adhesive or a resin having adhesive property.

In addition, the adhesive member may also have magnetic property by configuring the adhesive member to contain ferrite powders.

Since the antenna module 100 according to an embodiment configured as described above is manufactured in a form of a flat and thin substrate by coupling the magnetic part 80 to the coil part 40, but a direction of the magnetic field generated by the first antenna wiring 42 is formed along a surface direction of the antenna module 100, the antenna module 100 may be operated in a form such as a solenoid antenna.

Therefore, a shape or a direction of the magnetic field generated by the first antenna wiring 42 of the antenna module 100 may be adjusted to a specific direction.

In addition, since the antenna module 100 may be manufactured only by an operation of inserting the magnetic part 80 into the through-hole 49 of the coil part 40, the antenna module is very easily manufactured. In addition, since one magnetic part 80 is used for various short-range communications, an operation of manufacturing the antenna module is simplified as compared to the related art using magnetic parts.

Further, the second magnetic part 80b of the antenna module 100 according to an embodiment prevents the magnetic field formed by the second antenna wiring 43 as well as the magnetic field formed by the first pattern 42a from being leaked toward a rear surface of the second magnetic part 80b. Accordingly, radiation efficiency of the second antenna wiring 43 is increased.

Meanwhile, in an example in which the magnetic part 80 and the antenna wirings 42 and 43 have a great thickness difference, a thickness of the antenna module 100 may be entirely non-uniform and a great thickness deviation thereof may occur. In this example, it may be difficult to mount the antenna module in an electronic device.

Therefore, the magnetic part 80 according to an embodiment has the thickness the same as, or similar to, the thickness of the antenna wirings 42 and 43.

The antenna module according to the description is not limited to the above-mentioned embodiments, but may be variously modified.

Figure 5:
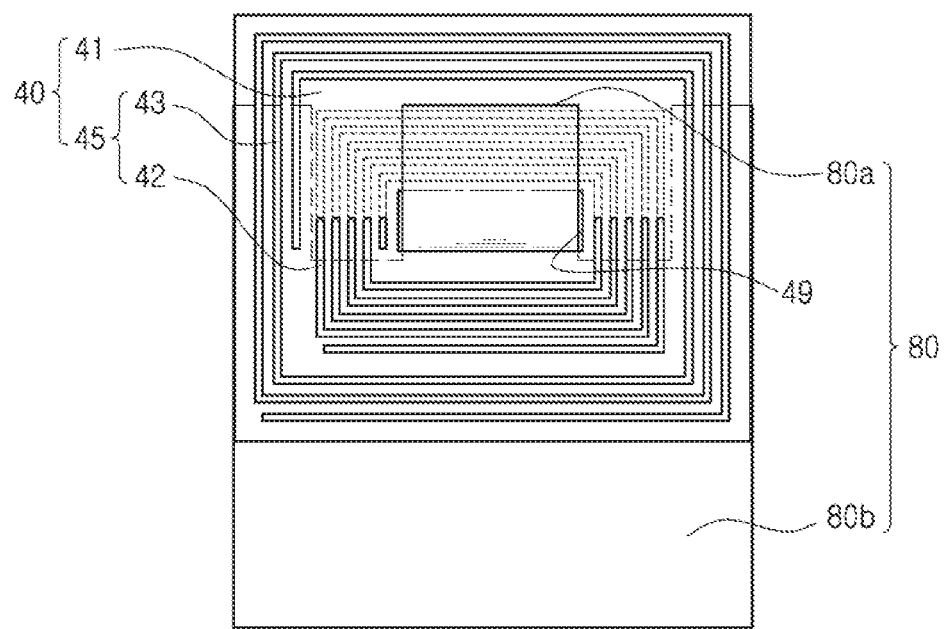
FIG. 5 is a plan view of an antenna module according to an embodiment.

FIG. 5 is a plan view of an antenna module according to an embodiment and FIG. 6 is an exploded perspective view of FIG. 5.

Referring to FIGS. 5 and 6, the antenna module according to an embodiment may have the second magnetic part 80*b* not disposed to face the entirety of the second antenna wiring and is disposed to only partially face the second antenna wiring.

The cutting part 85 may be formed in a form of cutting the second magnetic part 80*b* inwardly from a side surface of the second magnetic part 80*b*. The cutting part 85 may have a width wider than the embodiment described above, and may, for example, have a width similar to the width of the first antenna wiring. Accordingly, the cutting part 85 according to an embodiment is disposed to face the first antenna wiring 42.

Therefore, the magnetic part 80 according to an embodiment is configured so that the second magnetic part 80*b* is disposed on the other surface of the coil part 40 and faces a portion of the first antenna wiring 42 and a portion of the second antenna wiring 43. In addition, similarly to the embodiment described above, the first magnetic part 80*a* is inserted into the through-hole 49 and disposed to cover a portion of the first antenna wiring 42 on one surface of the coil part 40.

Such a configuration may be derived as a size of the magnetic part 80 is significantly reduced to be matched to a size of an internal space, when the internal space of the electronic device in which the antenna module is mounted is narrow.

Figure 7:
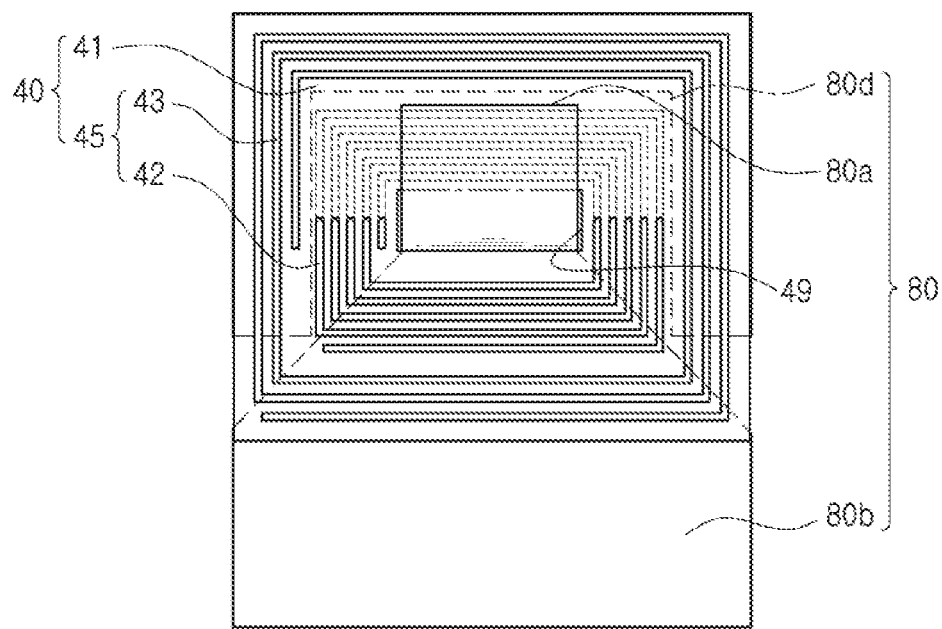
FIG. 7 is a plan view of an antenna module according to an embodiment.

FIG. 7 is a plan view of an antenna module according to an embodiment and FIG. 8 is an exploded perspective view of FIG. 7.

Referring to FIGS. 7 and 8, the antenna module according to an embodiment has a shape in which a width of a portion at which the second magnetic part 80*b* and the first magnetic part 80*a* are connected to each other becomes gradually narrow toward the first magnetic part 80*a*. Therefore, the second magnetic part 80*b* is disposed to face only some regions (e.g., a half or less) of the second antenna wiring 43.

The third magnetic part 80*d* is disposed on the region on which the second magnetic part 80*b* is not disposed. The third magnetic part 80*d* may not be formed integrally with the first and second magnetic parts 80*a* and 80*b* and may be provided independently from the first and second magnetic parts 80*a* and 80*b*.

Similarly to the second magnetic part 80*b*, the third magnetic part 80*d* is disposed on the second surface of the insulating substrate 41 and disposed to face the second antenna wiring 43. Therefore, the second antenna wiring 43 may face the second magnetic part 80*b* and the third magnetic part 80*d*.

According to an embodiment, the third magnetic part 80*d* has a shape of 'ᄃ' according to the shape of the second antenna wiring 43. However, the configuration of the present disclosure is not limited thereto.

Accordingly, the magnetic part 80 according to an embodiment is configured so that the second magnetic part 80*b* and the third magnetic part 80*d* are disposed on the other surface of the coil part 40 and face a portion of the first antenna wiring 42 and most of the second antenna wiring 43. In addition, similarly to the embodiment described above, the first magnetic part 80*a* may be inserted into the through-hole 49 and disposed to cover a portion of the first antenna wiring 42 on one surface of the coil part 40.

Figure 9:
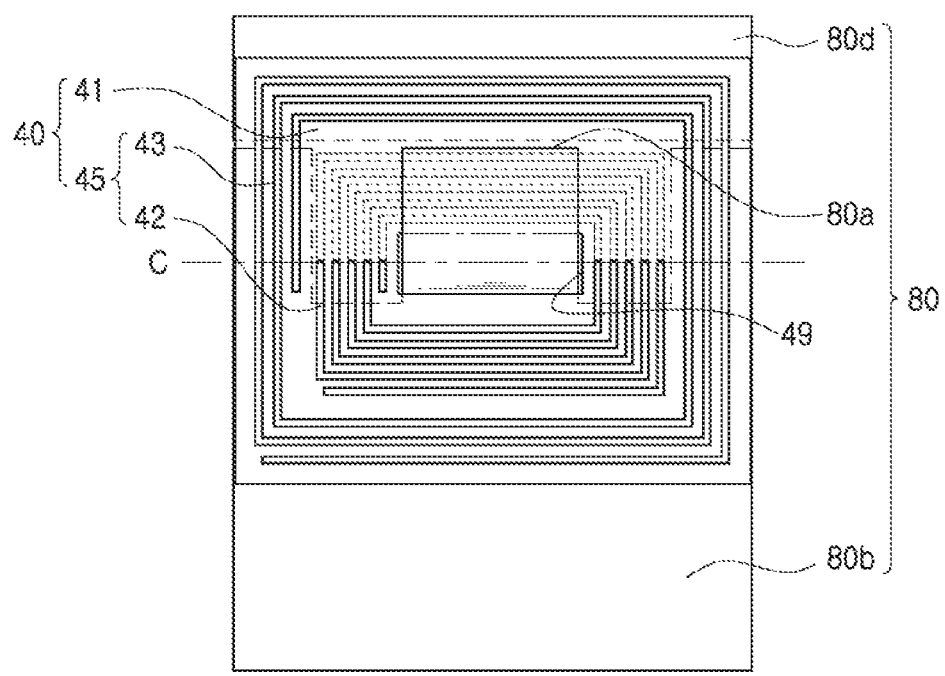
FIG. 9 is a plan view of an antenna module according to an embodiment.
Figure 10:
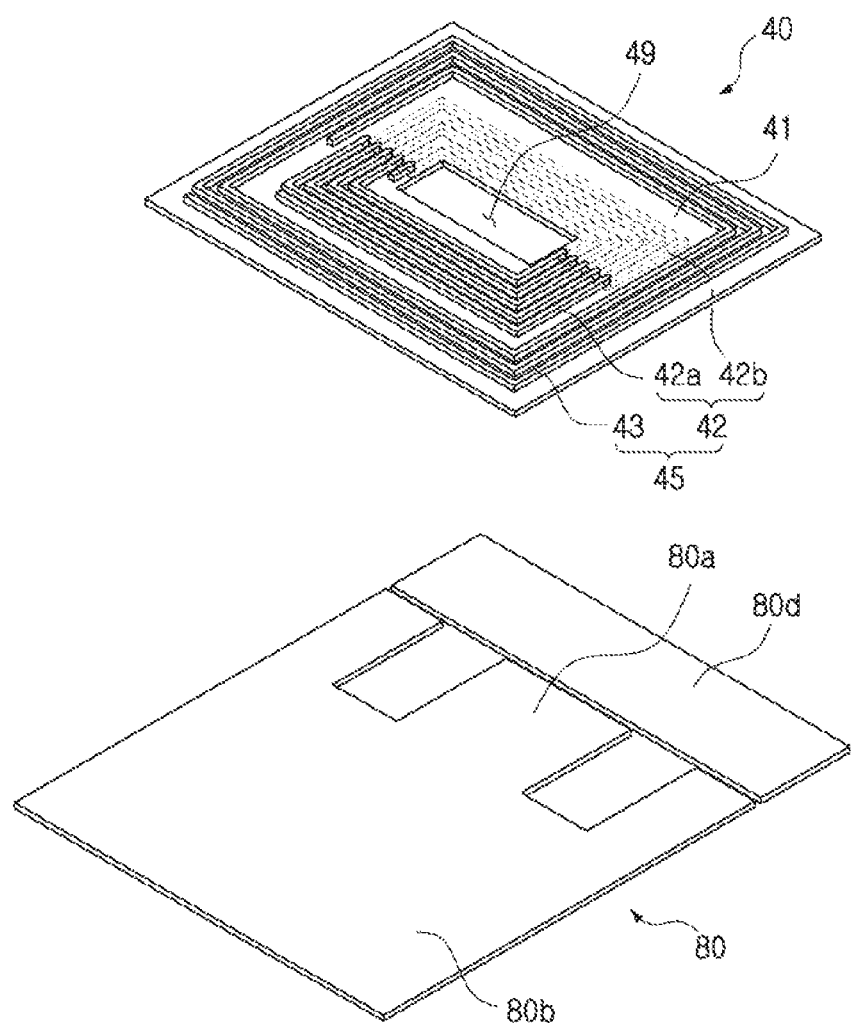
FIG. 10 is an exploded perspective view of FIG. 9.

FIG. 9 is a plan view of an antenna module according to an embodiment and FIG. 10 is an exploded perspective view of FIG. 9.

Referring to FIGS. 9 and 10, the antenna module according to an embodiment includes the first and second magnetic parts 80*a* and 80*b* and the third magnetic part 80*d* which are configured to be similar to the magnetic part 80 (FIG. 6) illustrated in FIG. 6 described above.

The third magnetic part 80*d* may not be formed integrally with the first and second magnetic parts 80*a* and 80*b* and may be provided independently from the first and second magnetic parts 80*a* and 80*b*.

According to an embodiment, the third magnetic part 80*d* has a rod form and is disposed to face one side of four sides of the second antenna wiring 43 formed in a quadrangular ring shape as a whole. Therefore, the third magnetic part 80*d* has a width similar to the width of the second antenna wiring 43.

By such a configuration, the magnetic part 80 according to an embodiment is configured so that the second magnetic part 80*b* and the third magnetic part 80*d* are disposed on the other surface of the coil part 40 and face a portion of the first antenna wiring 42 and most of the second antenna wiring 43. In addition, similarly to the embodiment described above, the first magnetic part 80*a* is inserted into the through-hole 49 and disposed to cover a portion of the first antenna wiring 42 on one surface of the coil part 40.

The third magnetic part 80*d* may be bonded to the coil part 40 through an adhesive member (not shown). However, the third magnetic part 80*d* is not limited thereto.

As such, magnetic parts 80 according to an embodiment may be used in combination as needed.

Figure 11:
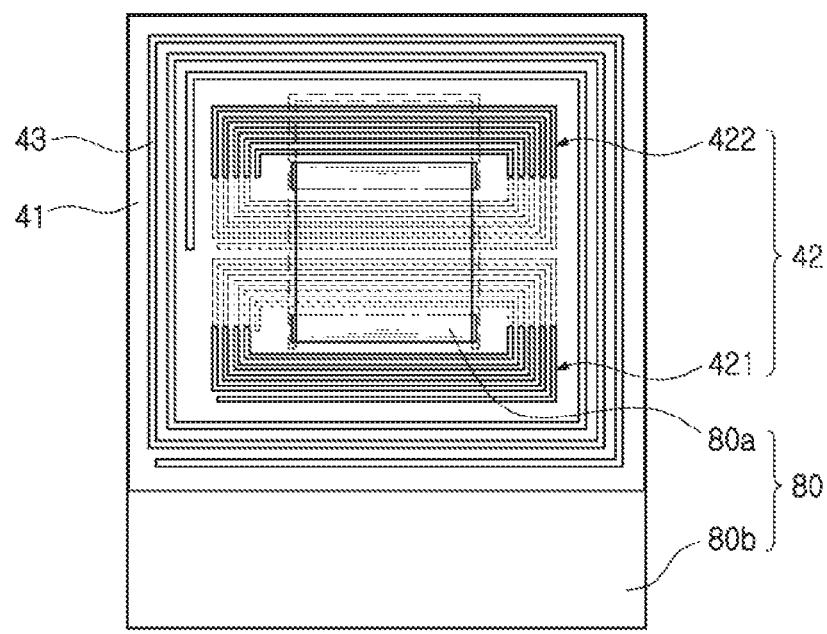
FIG. 11 is a plan view of an antenna module according to an embodiment.
Figure 12:
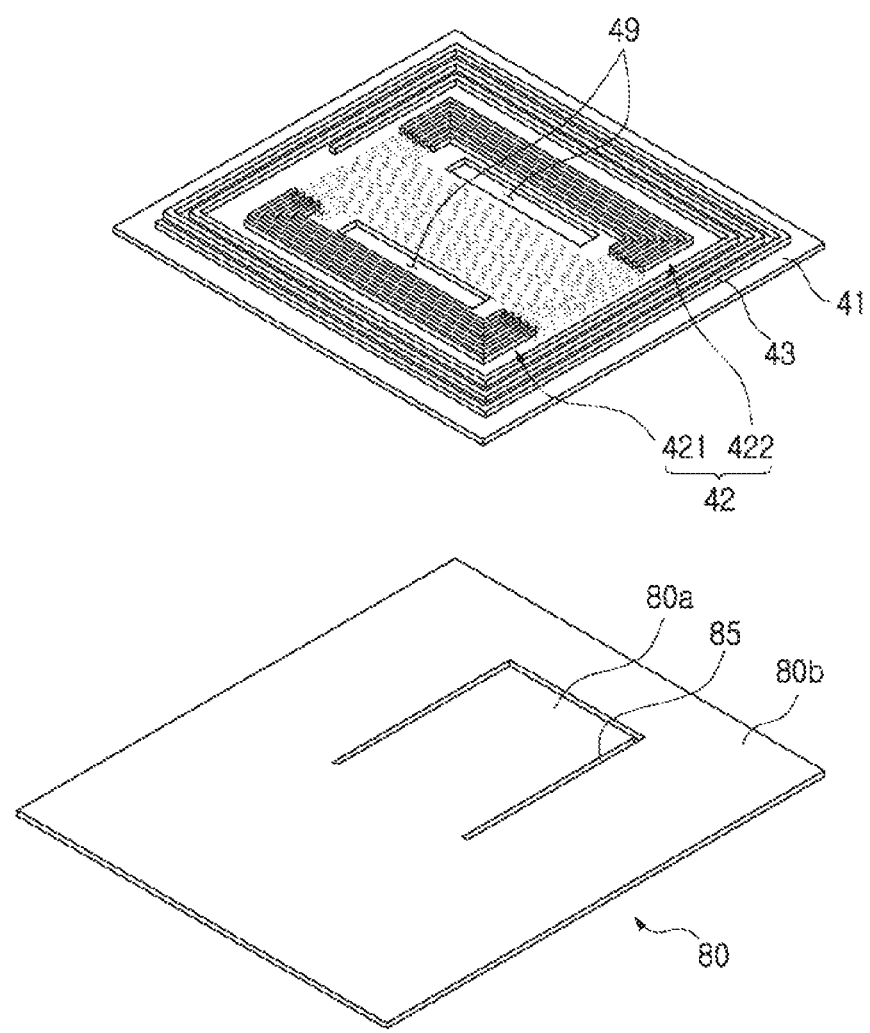
FIG. 12 is an exploded perspective view of FIG. 11.

FIG. 11 is a plan view of an antenna module according to an embodiment and FIG. 12 is an exploded perspective view of FIG. 11.

Referring to FIGS. 11 and 12, the antenna module according to an embodiment has the first antenna wiring 42 including a first wiring 421 and a second wiring 422.

The first wiring 421 and the second wiring 422 are each formed on the insulating substrate 41 in a structure similar to the first antenna wiring 42 (FIG. 4) of the embodiment described above, and are disposed to be spaced apart from each other by a predetermined distance.

In addition, the first wiring 421 and the second wiring 422 are each disposed so that the wiring disposed on the first surface of the insulating substrate 41 is disposed on an outer side of the wiring disposed on the second surface of the insulating substrate 41. Therefore, the first wiring 421 and the second wiring 422 may be disposed to be line-symmetrical with each other with respect to the center of the insulating substrate 41.

The through-hole 49 may be each formed in the centers of the first wiring 421 and the second wiring 422. In addition, the first magnetic part 80*a* penetrates through both the two through-holes 49 and is coupled to the coil part 40.

Thereby, an end of the first magnetic part 80*a* is disposed on the second surface of the insulating substrate 41 and a portion connecting the end and the second magnetic part 80*b* with each other is disposed on the first surface of the insulating substrate 41. Accordingly, the entirety of the first magnetic part 80*a* is coupled to the insulating substrate 41 without interfering with the first wiring 421 and the second wiring 422.

Meanwhile, although not illustrated, the first wiring 421 and the second wiring 422 may be connected in series with or in parallel to each other. However, the first wiring 421 and the second wiring 422 are not limited thereto, but may also be configured to be operated independently from each other.

The second antenna wiring 43 may accommodate the first wiring 421 and the second wiring 422 in an internal region and may be disposed in a spiral shape along an outer portion of the insulating substrate 41.

Figure 13:
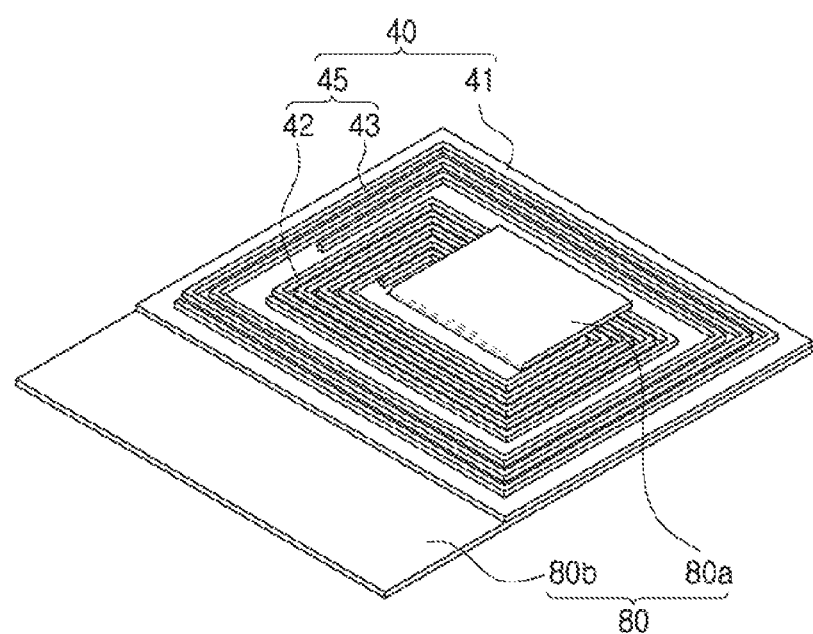
FIG. 13 is a perspective view of an antenna module according to an embodiment.
Figure 14:
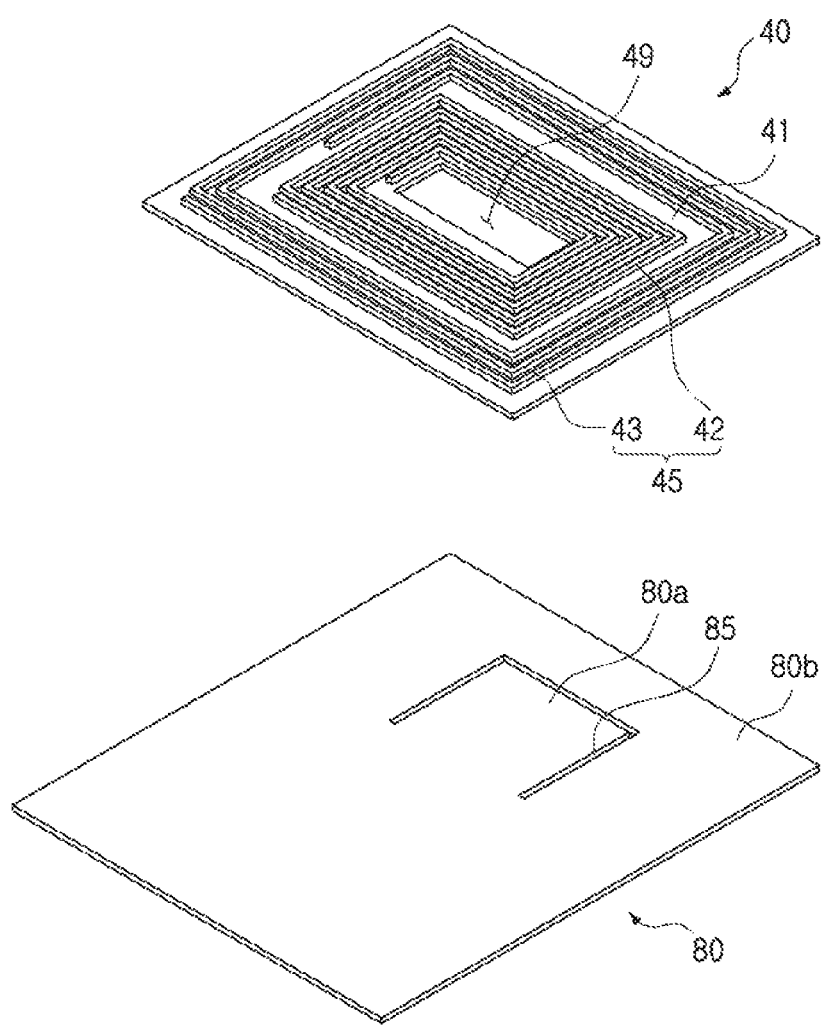
FIG. 14 is an exploded perspective view of FIG. 13.

FIG. 13 is a perspective view of an antenna module according to an embodiment and FIG. 14 is an exploded perspective view of FIG. 13.

Referring to FIGS. 13 and 14, the antenna module according to an embodiment has the first antenna wiring 42 of which the entirety is disposed on the first surface of the insulating substrate 41 similarly to the second antenna wiring 43.

However, the configuration of the present disclosure is not limited thereto and the entirety of the first antenna wiring 42 may also be disposed on the second surface of the insulating substrate 41. Further, various modifications are possible as needed. For example, both the first antenna wiring 42 and the second antenna wiring 43 may be disposed on the second surface of the insulating substrate 41.

FIGS. 15 through 18 are exploded perspective views each of an antenna module according to an embodiment, and each of the coil parts 40 may be configured to be the same as the coil part 40 illustrated in FIG. 14. However, the coil part 40 is not limited thereto.

Figure 15:
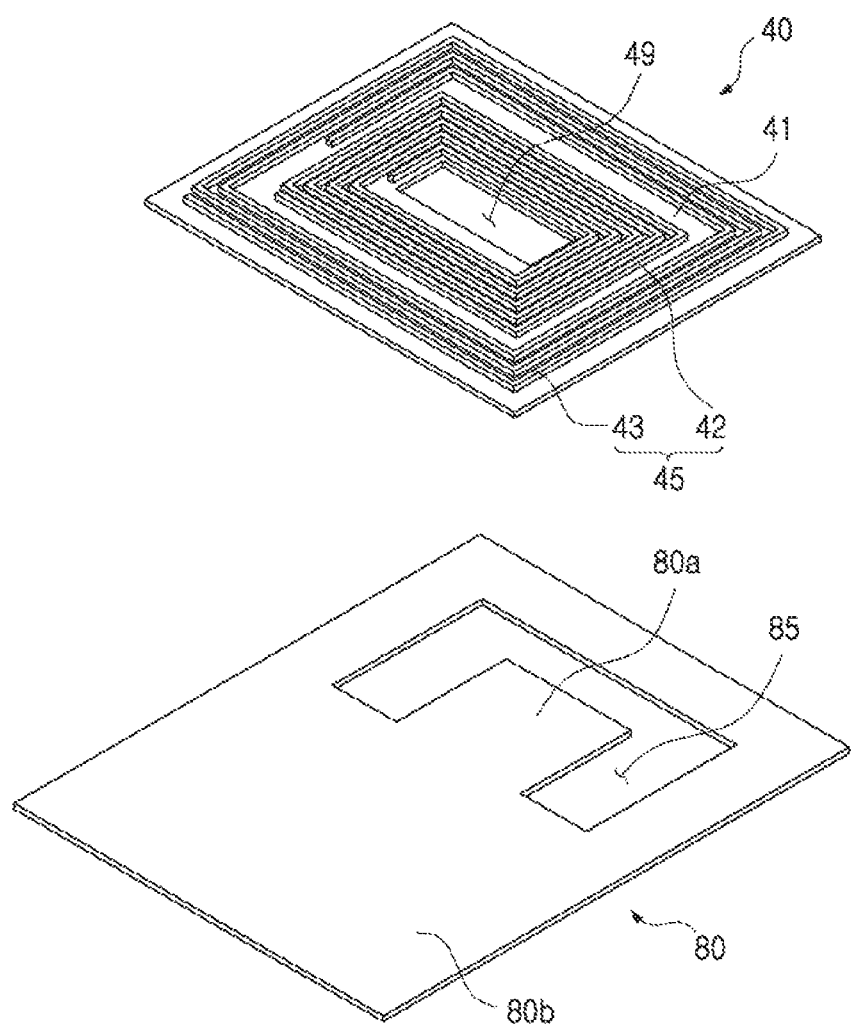

Referring first to FIG. 15, the antenna module according to an embodiment has the magnetic part 80 configured to be similar to the magnetic part 80 illustrated in FIG. 14 and the cutting part 85 having a width wider than the embodiment described above. Further, at least a portion of the cutting part 85 has a width corresponding to the first antenna wiring 42, and accordingly, a portion of the cutting part 85 is disposed to face the first antenna wiring 42.

Accordingly, the magnetic part 80 according to an embodiment is configured so that the second magnetic part 80b is disposed on the other surface of the coil part 40 and faces the entirety of the second antenna wiring 43 and only some regions of the first antenna wiring 42.

Similarly to the embodiment described above, the first magnetic part 80a is inserted into the through-hole 49 and disposed to cover a portion of the first antenna wiring 42 on one surface of the coil part 40.

Figure 16:
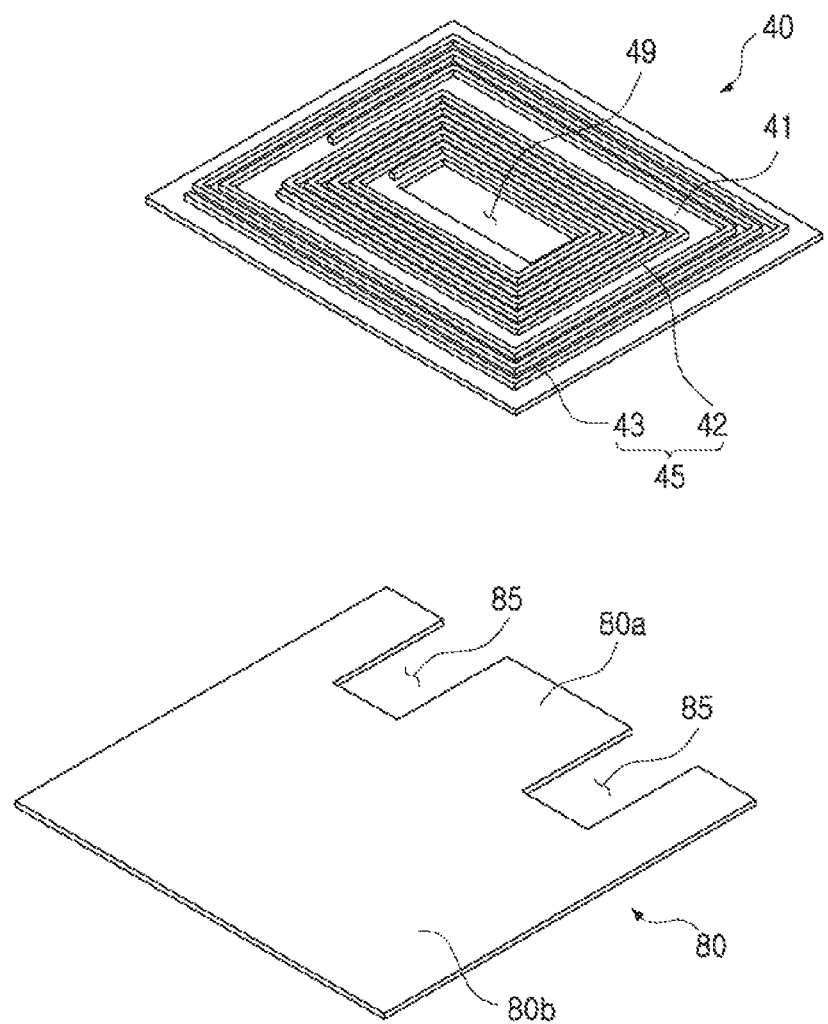

The antenna module illustrated in FIG. 16 has the magnetic part 80 configured to be similar to the magnetic part 80 shown in FIG. 6. Therefore, the second magnetic part 80b is disposed on the other surface of the coil part 40 to face a portion of the second antenna wiring 43 not the entirety thereof. In addition, the first magnetic part 80a is inserted into the through-hole 49 and disposed to cover a portion of the first antenna wiring 42 on one surface of the coil part 40.

Further, a portion of the first antenna wiring 42 is disposed to face the cutting part 85.

The antenna module shown in FIG. 17 may have the coil part 40 including only the first antenna wiring 42. In addition, the magnetic part 80 may be configured to be similar to the first magnetic part 80a and the second magnetic part 80b shown in FIG. 8.

Therefore, the second magnetic part 80b according to an embodiment is disposed to face only some regions (e.g., a half or less) of the first antenna wiring 42. In addition, the first magnetic part 80a is inserted into the through-hole 49 and disposed to cover a portion of the first antenna wiring 42 on one surface of the coil part 40.

Figure 18:
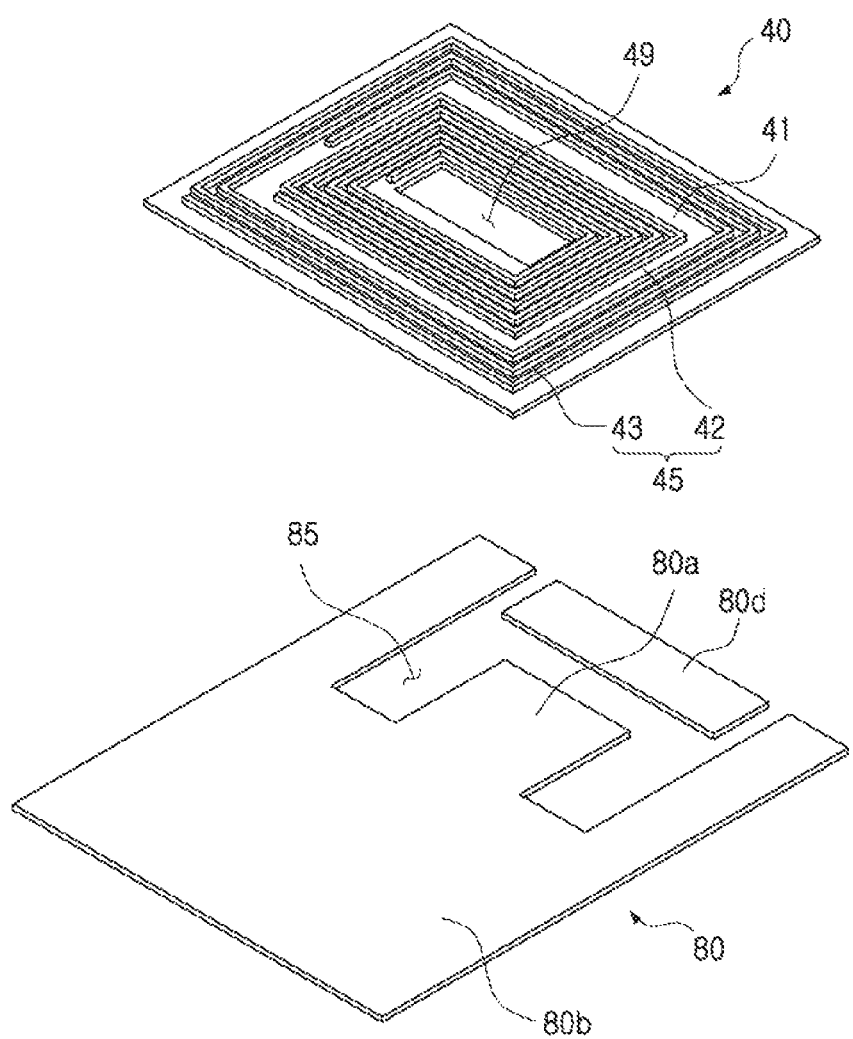

The antenna module illustrated in FIG. 18 has the magnetic part 80 configured to be similar to the magnetic part 80 illustrated in FIG. 10 and may be slightly different in a size of the third magnetic part 80d. The third magnetic part 80d according to an embodiment is disposed to be spaced apart from the first magnetic part 80a by a predetermined distance and has a width similar to the width of the second antenna wiring 43. Therefore, the third magnetic part 80d is disposed so as not to face the first antenna wiring 42 and to face only the second antenna wiring 43.

Accordingly, the second magnetic part 80b and the third magnetic part 80d are disposed on the other surface of the coil part 40 to face the second antenna wiring 43. In addition, the first magnetic part 80a is inserted into the through-hole 49 and disposed to cover a portion of the first antenna wiring 42 on one surface of the coil part 40.

Meanwhile, the antenna module shown in FIGS. 13 through 16, and 18 may implement the coil part 45 by forming a flexible PCB (FPCB) with the first antenna wiring 42 formed in a single side structure like the second antenna wiring 43. Accordingly, cost for manufacturing the FPCB is significantly reduced.

Figure 19:
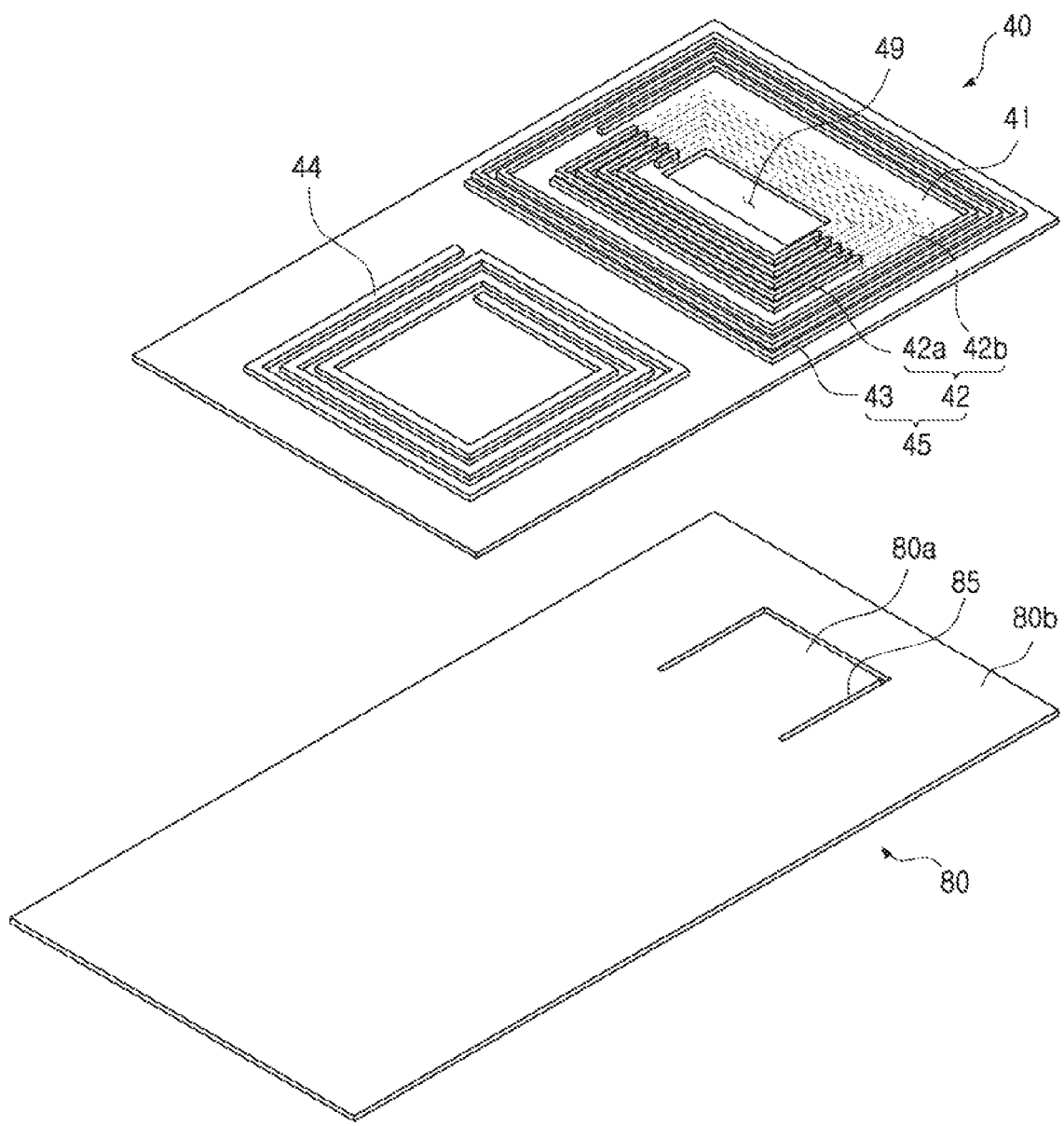
FIG. 19 is an exploded perspective view of an antenna module according to an embodiment.

FIG. 19 is an exploded perspective view of an antenna module according to an embodiment.

Referring to FIG. 19, the antenna module according to an embodiment may have the coil part 40 including a third antenna wiring 44.

The third antenna wiring 44, a power receiving wiring, may be formed as a wiring having a spiral shape similarly to the second antenna wiring 43.

According to an embodiment, the third antenna wiring 44 is formed on the first surface of the insulating substrate 41 similarly to the second antenna wiring 43. However, the third antenna wiring 44 is not limited thereto, but may also be disposed to be distributed on opposite surfaces of the insulating substrate 41 or formed on the second surface of the insulating substrate 41, similarly to the first antenna wiring 42. In addition, the third antenna wiring may be variously modified. For example, the third antenna wirings may be formed in the same spiral shape on the opposite surfaces of the insulating substrate 41 and the third antenna wirings may be connected in series with or in parallel to each other.

A portion of the second magnetic part 80b may be disposed to face the third antenna wiring 44. According to an embodiment, the second magnetic part 80b is configured to face a portion of the first antenna wiring 42 (e.g., the first pattern), the entirety of the second antenna wiring 43, and the entirety of the third antenna wiring 44. However, the second magnetic part 80b is not limited thereto, but may be variously modified as needed. For example, the second magnetic part 80b may be configured to partially face the second antenna wiring 43 and the third antenna wiring 44.

Meanwhile, according to an embodiment, the third antenna wiring 44 is disposed in an external region of the second antenna wiring 43, not an internal region thereof. However, the configuration of the present disclosure is not limited thereto, but may be variously modified as needed. For example, the size of the second antenna wiring 43 may be extended and the third antenna wiring 44 may be disposed in the internal region of the second antenna wiring 43.

Such a third antenna wiring 44 may be used as a wireless charging coil. However, the third antenna wiring 44 is not limited thereto.

Meanwhile, although not illustrated, the first antenna wiring 42 may be connected in series with (e.g., a shape of 8 or a shape of B) or in parallel to the third antenna wiring

44. Further, the second antenna wiring 43 may also be connected in series with or in parallel to the third antenna wiring 44.

When a design area of the first antenna wiring 42 or the second antenna wiring 43 is insufficient, the design area may be increased by using the third antenna wiring 44 through such a configuration, thereby significantly increasing performance of the antenna.

Figure 21:
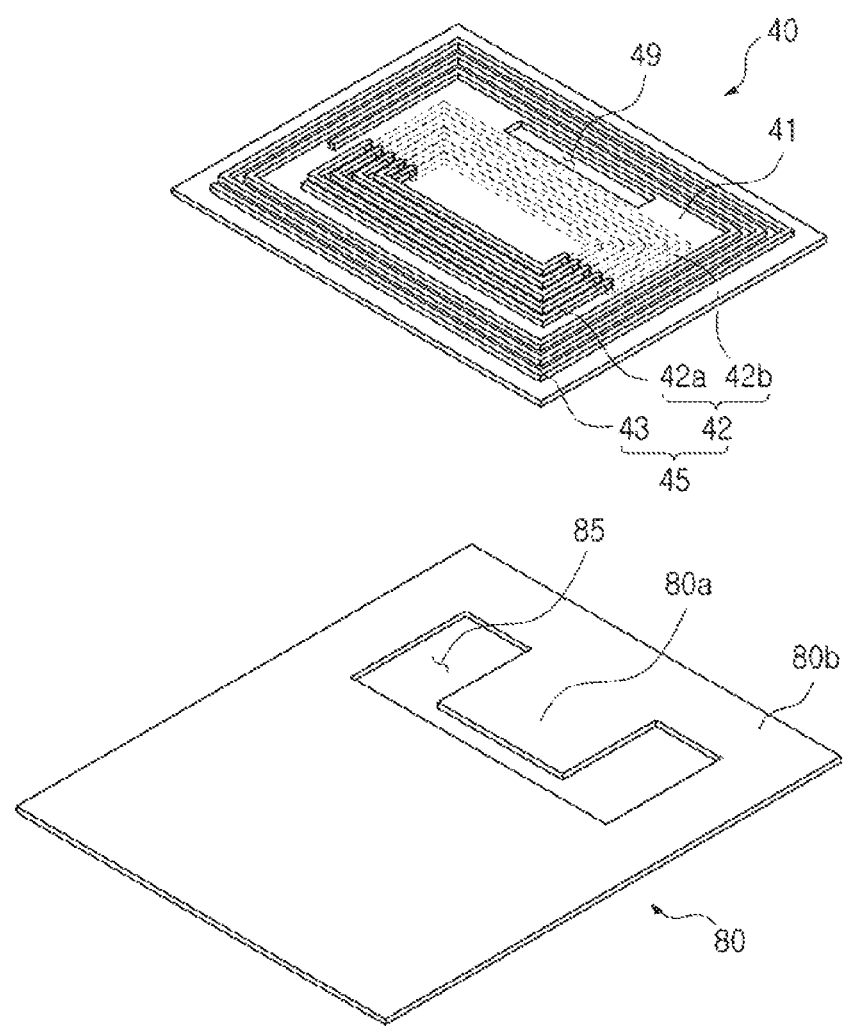
FIG. 21 is an exploded perspective view of the antenna module shown in FIG. 20.

FIG. 20 is a perspective view of an antenna module according to an embodiment and FIG. 21 is an exploded perspective view of the antenna module illustrated in FIG. 20.

Referring to FIGS. 20 and 21, the antenna module according to an embodiment may have the through-hole 49 of the coil part 40 disposed in the external region of the first antenna wiring 42, not in the internal region of the first antenna wiring 42. In more detail, the through-hole 49 is disposed in the internal region of the second antenna wiring 43 and disposed in a region between the first antenna wiring 42 and the second antenna wiring 43.

In addition, corresponding to a position of the through-hole 49, the first magnetic part 80*a* is configured so that an end thereof is directed to the center of the magnetic part 80 and the first magnetic part 80*a* is disposed on the center region of the first antenna wiring 42 on one surface of the coil part 40. In addition, a portion of the second magnetic part 80*b* is disposed on the center region of the first antenna wiring 42 on the other surface of the coil part 40.

Accordingly, the magnetic part 80 according to an embodiment is configured so that the second magnetic part 80*b* is disposed on the other surface of the coil part 40 and faces the entirety of the second antenna wiring 43 and only some regions of the first antenna wiring 42.

In addition, the first magnetic part 80*a* may be inserted into the through-hole 49 and disposed to cover a portion of the first antenna wiring 42 on one surface of the coil part 40.

Figure 22:
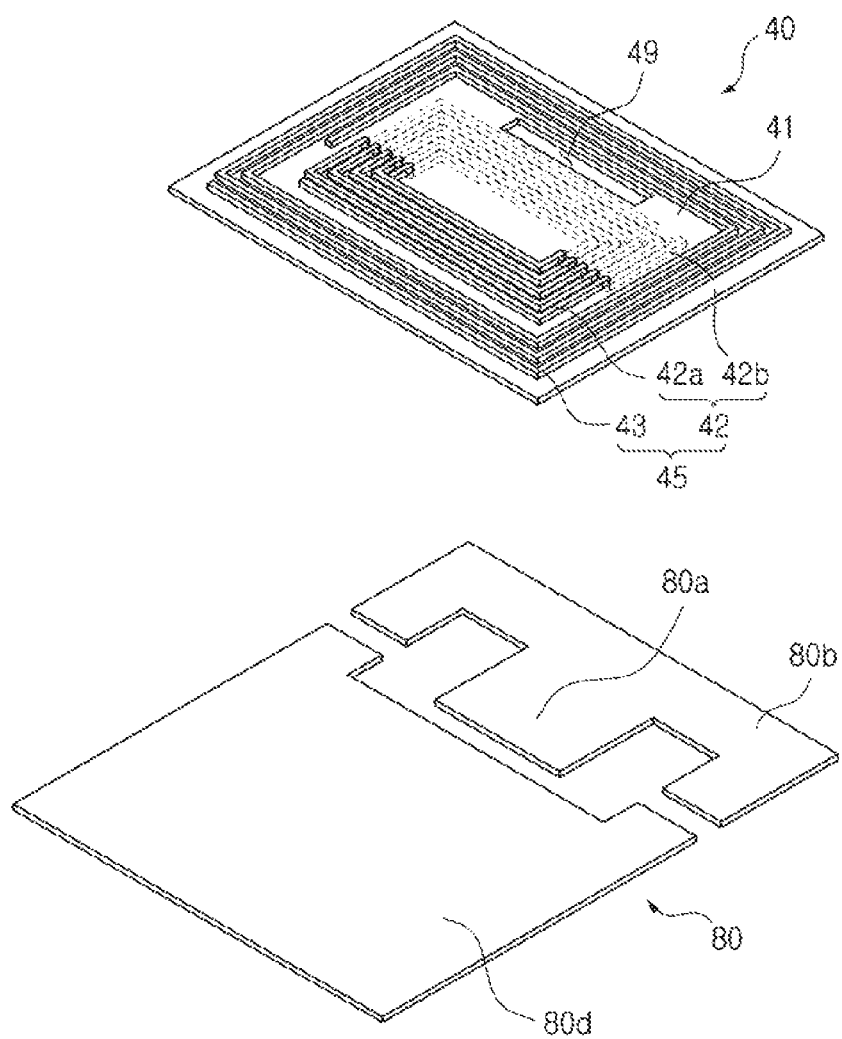
FIGS. 22 and 23 are exploded perspective views of modified examples of the antenna module illustrated in FIG. 21.
Figure 23:
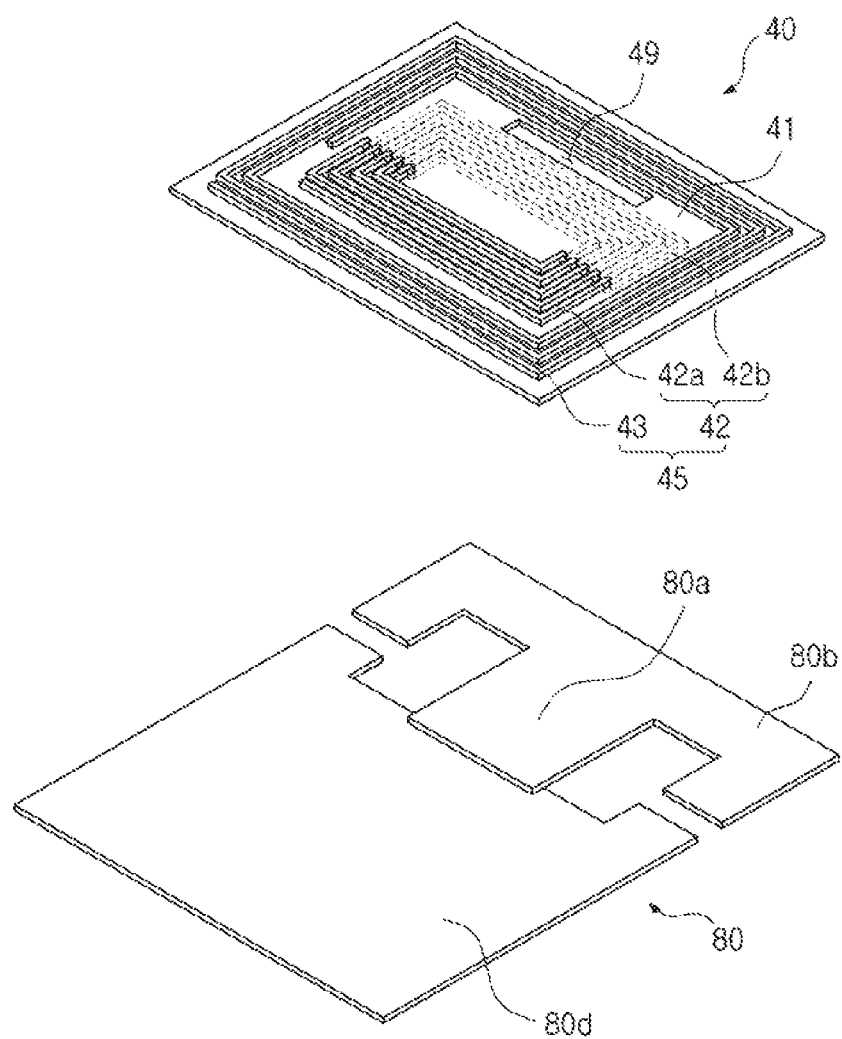

FIGS. 22 and 23 are exploded perspective views of modified examples of the antenna module illustrated in FIG. 21.

Referring to FIG. 22, the antenna module according to an embodiment may have the coil part 40 configured in the same manner as the coil part 40 illustrated in FIG. 20.

According to an embodiment, the magnetic part 80 may comprise two members. In detail, the magnetic part 80 may comprise a member including the first magnetic part 80*a* inserted into the through-hole 49 and covering a portion of the first antenna wiring 42 on one surface of the coil part 40 and a second magnetic part 80*b* disposed on the other surface of the coil part 40 and connected to the first magnetic part 80*a*, and the third magnetic part 80*d* disposed on the other surface of the coil part 40 and disposed to be spaced apart from the member.

According to an embodiment, the third magnetic part 80*d* has an area greater than the second magnetic part 80*b*, but the configuration of the present disclosure is not limited thereto. The sizes or shapes of the second magnetic part 80*b* and the third magnetic part 80*d* may be variously modified as needed.

Referring to FIG. 23, the antenna module according to an embodiment may have the coil part 40 configured in the same manner as the coil part 40 illustrated in FIG. 20.

In addition, the magnetic part 80 may be disposed so that a length of the first magnetic part 80*a* is extended and a portion of the first magnetic part 80*a* overlaps with the third magnetic part 80*d*.

In this case, the portion that the first magnetic part 80*a* and the third magnetic part 80*d* overlap each other is confined as the center region of the first antenna wiring 42.

Meanwhile, according to an embodiment, since the second magnetic part 80*b* and the third magnetic part 80*d* are separated from each other, a portion of the first magnetic part 80*a* may overlap the third magnetic part 80*d*, but the configuration of the present disclosure is not limited thereto.

Various modifications are possible and for example, the magnetic part 80 may be formed of one member as illustrated in FIG. 20 and a portion of the first magnetic part 80*a* may overlap the second magnetic part 80*b* as in the present embodiment.

Figure 24:
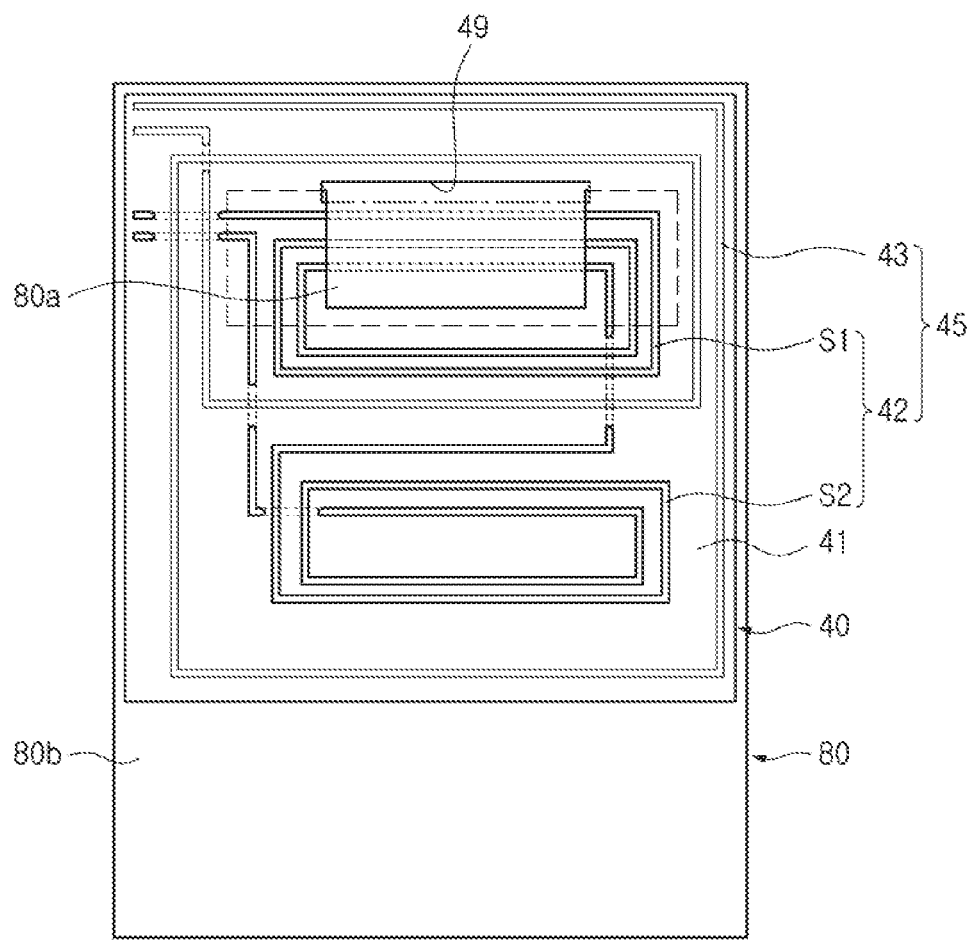
FIG. 24 is a plan view of an antenna module according to an embodiment.

FIG. 24 is a plan view of an antenna module according to an embodiment.

Referring to FIG. 24, the coil part 40 according to an embodiment has the through-hole 49 disposed between the first antenna wiring 42 and the second antenna wiring 43. Accordingly, the magnetic part 80 may also be configured so that an end of the first magnetic part 80*a* is directed to the center of the magnetic part 80, as illustrated in FIG. 21.

Further, according to an embodiment, the first antenna wiring 42 includes two spiral parts S1 and S2 which are formed in a spiral shape. A first spiral part S1 is disposed in a position corresponding to the first magnetic part 80*a* and at least a portion thereof faces the first magnetic part 80*a*. In addition, a second spiral part S2 is disposed to be spaced apart from the first spiral part S1 and may not face the first magnetic part 80*a*, and at least a portion thereof may face the second magnetic part 80*b*. According to the present embodiment, the entirety of the second spiral part S2 may face the second magnetic part 80*b*.

Both the first spiral part S1 and the second spiral part S2 may be continuously formed by one wiring.

Further, the first antenna wiring 42 may be disposed in the internal region of the second antenna wiring 43, and the first spiral part S1 and the second spiral part S2 may be disposed to be distributed at a boundary of a turn (or a coil strand) of the second antenna wiring 43. Therefore, the second spiral part S2 is disposed in a region between turns of the second antenna wiring 43, and to this end, the second antenna wiring 43 provides a region of a size such that the second spiral part S2 may be disposed between the turns.

The first spiral part S1 and the second spiral part S2 may basically be disposed on the first surface of the insulating substrate 41. In addition, the portions in which the antenna wirings 45 intersect each other may be disposed to be distributed through the second surface of the insulating substrate 41.

Meanwhile, according to an embodiment, the first spiral part S1 and the second spiral part S2 have spiral directions which are opposite to each other. However, the configuration of the present disclosure is not limited thereto.

Figure 25:
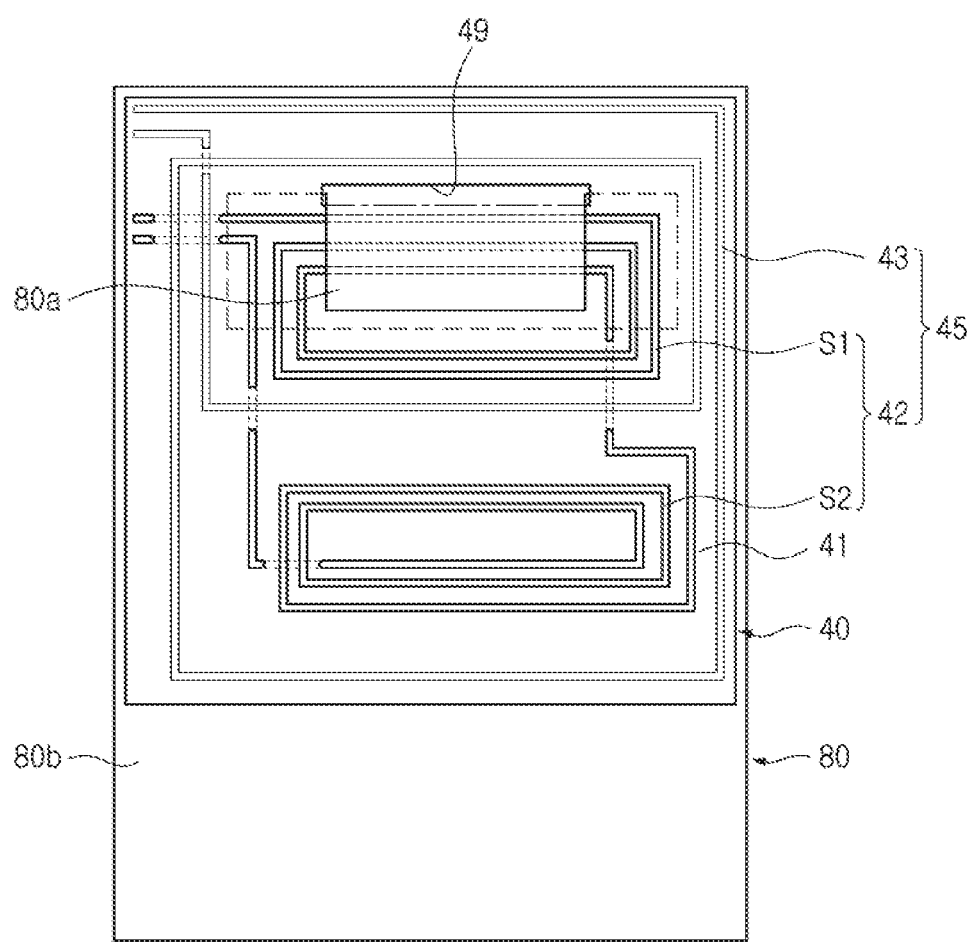
FIGS. 25 through 27 are plan views of modified examples of the antenna module illustrated in FIG. 24.
Figure 26:
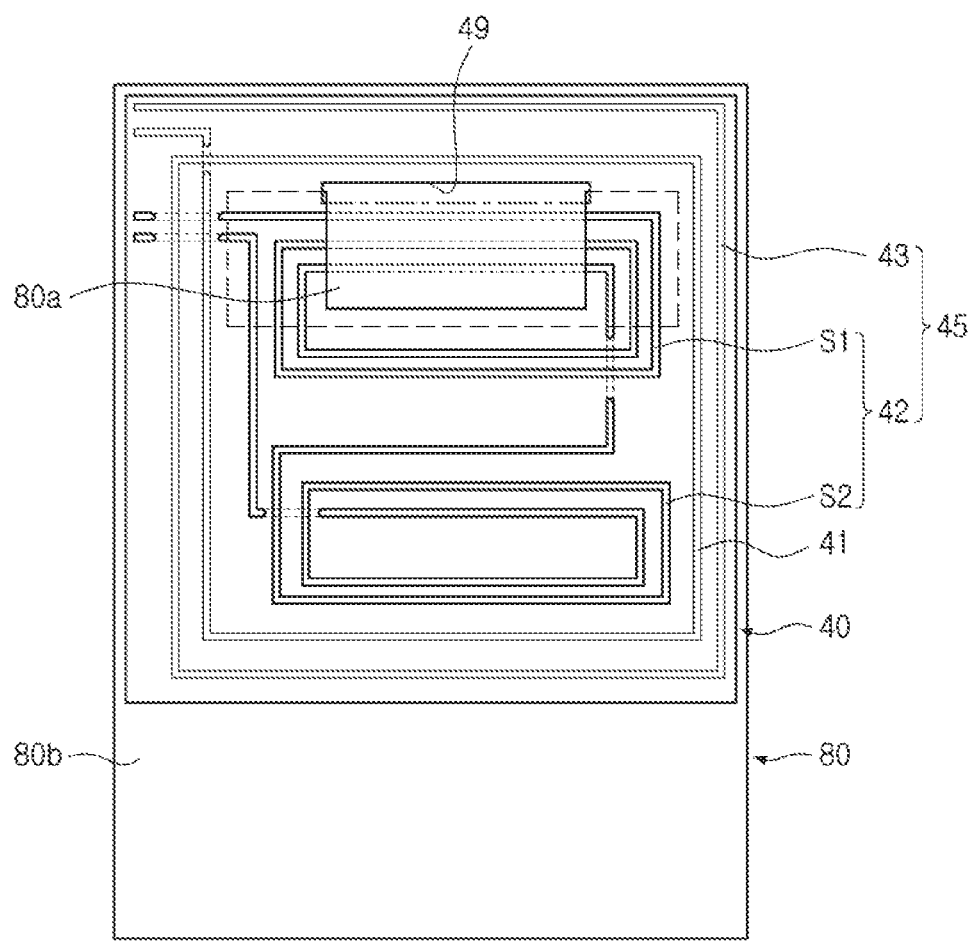
Figure 27:
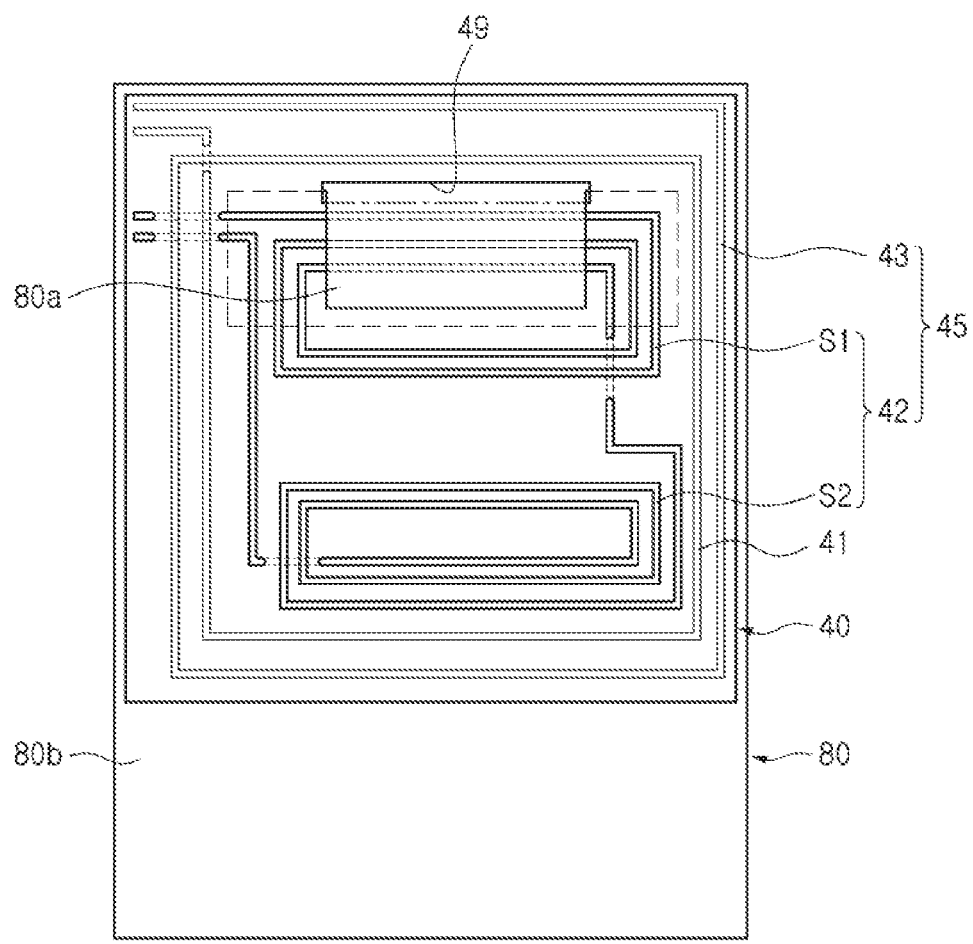

FIGS. 25 through 27 are plan views of modified examples of the antenna module illustrated in FIG. 24.

Referring first to FIG. 25, the antenna module according to an embodiment may have the spiral direction of the first spiral part S1 and the spiral direction of the second spiral part S2 formed in the same direction.

Referring to FIG. 26, the antenna module according to an embodiment may have the first spiral part S1 and the second spiral part S2 having spiral directions which are opposite to each other.

In addition, the first spiral part S1 and the second spiral part S2 may not be disposed to be distributed at the boundary of the turn of the second antenna wiring 43 and may be all disposed in an internal center region of the second antenna wiring 43.

Referring to FIG. 27, the antenna module according to an embodiment has the spiral direction of the first spiral part S1 and the spiral direction of the second spiral part S2 formed in the same direction.

In addition, the first spiral part S1 and the second spiral part S2 are not disposed to be distributed at the boundary of the turn of the second antenna wiring 43 and are all disposed in an internal center region of the second antenna wiring 43.

As such, the antenna module according to the description may be variously modified.

Figure 28:
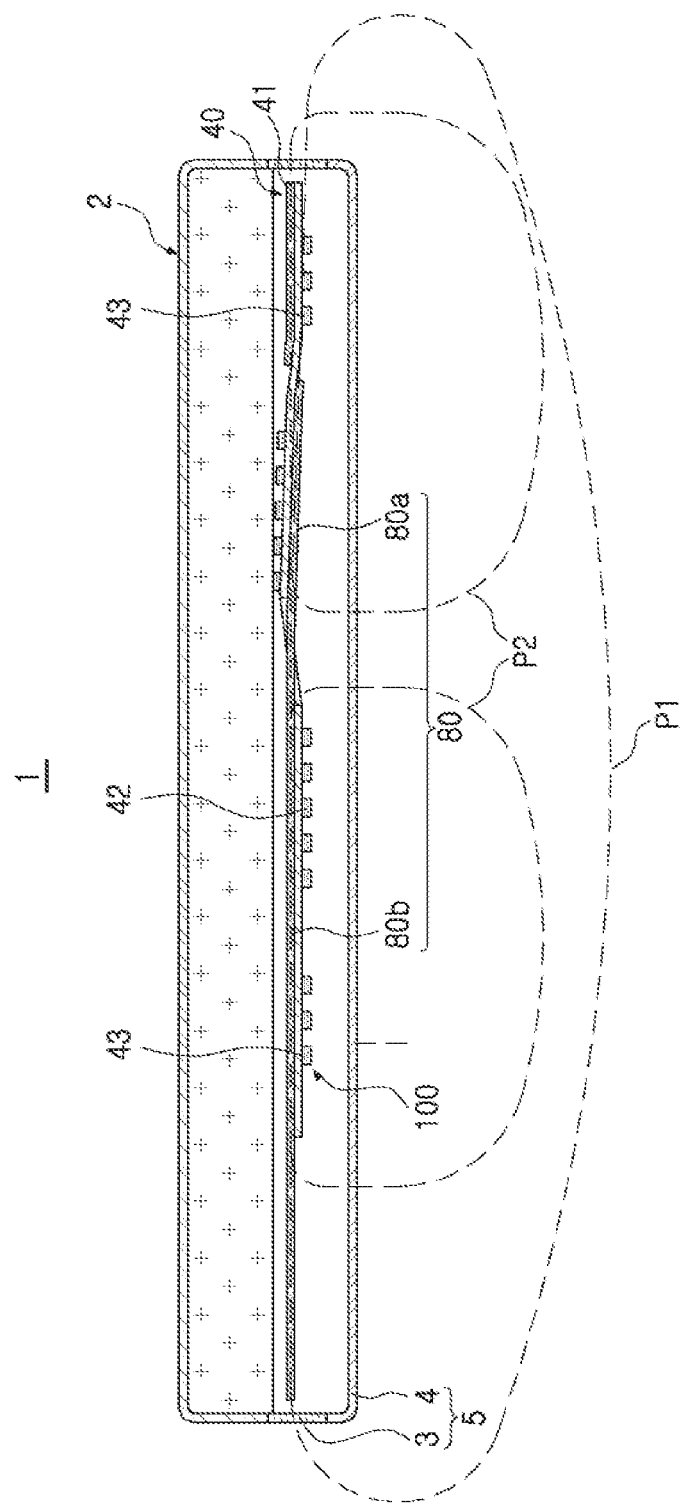
FIG. 28 is a cross-sectional view of an electronic device according to an embodiment.

FIG. 28 is a cross-sectional view of an electronic device according to an embodiment.

Referring to FIG. 28, an electronic device 1 according to an embodiment, a portable terminal including the antenna module 100 (FIG. 1) described above, may perform short-range communications through the antenna module 100.

The electronic device 1 may include a terminal body 2, a case 5, and the antenna module 100.

The antenna module 100 may be disposed in an inner space formed by the terminal body 2 and the case 5.

The case 5 may include a side cover 3 and a rear cover 4. According to an embodiment, the side cover 3 and the rear cover 4 may be formed of the same material or may be formed of different materials.

The magnetic part 80 may be disposed so that a side surface thereof faces the side cover 3.

Accordingly, the magnetic field formed by the first antenna wiring 42 is formed to penetrate through the side of the case 5 as illustrated by P1 in FIG. 28. Therefore, the side cover 3 may be formed of a material that does not shield the magnetic flux.

In addition, the magnetic field formed by the second antenna wiring 43 is formed to penetrate through the rear cover 4 of the case 5 as illustrated by P2. Therefore, the rear cover 4 may also be formed of a material that does not shield the magnetic flux.

Meanwhile, the electronic device described in the present embodiment may include a cellular phone (or a smartphone). However, the electronic device is not limited thereto, but may include any electronic device which may be carried and perform wireless communications such as a notebook, a tablet PC, a wearable device, and the like.

As set forth above, according to embodiments, the antenna module may have the coil part and the magnetic part which are coupled to each other only by the operation of inserting the magnetic part into the coil part. Therefore, the antenna module is easily manufactured and a manufacturing time of the antenna module is significantly reduced.

Further, since one antenna module includes the two antenna wirings having different radiation directions, a plurality of short-range communications are possible even though one antenna module is mounted in the electronic device.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna module comprising:
   a coil part including a second antenna wiring formed in a spiral shape on a first surface of an insulating substrate and a first antenna wiring disposed on the first surface of the insulating substrate in an internal region of the second antenna wiring; and
   a magnetic part including a second magnetic part disposed on a second surface of the insulating substrate and a first magnetic part extending from the second magnetic part, penetrating through the internal region of the second antenna wiring, and disposed on the first surface of the insulating substrate,
   wherein the first antenna wiring includes:
      interlayer connection conductors disposed in the insulating substrate;
      a first pattern disposed on the first surface of the insulating substrate and disposed on one side of the insulating substrate based on the interlayer connection conductors; and
      a second pattern disposed on the second surface of the insulating substrate and disposed on another side of the insulating substrate based on the interlayer connection conductors, and
   wherein the first magnetic part is disposed in the internal region of the second antenna wiring, is disposed to face a portion of the first antenna wiring, and is disposed to face the second pattern while having the insulating substrate interposed between the first magnetic part and the second pattern.

2. The antenna module of claim 1, wherein the first magnetic part penetrates through a center region of the first antenna wiring.

3. The antenna module of claim 1, wherein the magnetic part includes a cutting part that partially cuts the magnetic part, and
   the first magnetic part and the second magnetic part are classified by the cutting part.

4. The antenna module of claim 3, wherein the cutting part is disposed so that at least a portion of the cutting part faces the first antenna wiring.

5. The antenna module of claim 1, wherein the magnetic part further includes a third magnetic part disposed on the second surface of the insulating substrate and disposed to be spaced apart from the second magnetic part.

6. The antenna module of claim 1, wherein the magnetic part is configured such that the second magnetic part has a wider width and a wider area than the first magnetic part.

7. The antenna module of claim 1, wherein the magnetic part includes a cutting part formed in a form of cutting the second magnetic part inwardly from a side surface of the second magnetic part.

8. The antenna module of claim 1, wherein the second magnetic part is disposed to partially face the second antenna wiring, and
   the first magnetic part is disposed in a form of penetrating through the insulating substrate and covering a portion of the first antenna wiring.

9. The antenna module of claim 1, wherein the first pattern and the second pattern include linear patterns, respectively, and the linear patterns of the first pattern and the linear patterns of the second pattern are connected to each other through the interlayer connection conductors to form one coil turn.

10. An antenna module comprising:

a coil part including a second antenna wiring formed on a first surface of an insulating substrate and used as a near field communication (NFC) antenna, and a first antenna wiring disposed in an internal region of the second antenna wiring and used as a magnetic secure transmission (MST) antenna; and a magnetic part including a second magnetic part disposed on a second surface of the insulating substrate, and a first magnetic part extending from the second magnetic part, penetrating through the internal region of the second antenna wiring, and disposed on the first surface of the insulating substrate, wherein the first antenna wiring includes a first spiral part and a second spiral part disposed to be spaced apart from each other in the internal region of the second antenna wiring, the first magnetic part is disposed in the internal region of the second antenna wiring and disposed to face a portion of the first antenna wiring wherein the first spiral part and the second spiral part each include:

interlayer connection conductors disposed in the insulating substrate;

a first pattern disposed on the first surface of the insulating substrate and disposed on one side of the insulating substrate based on the interlayer connection conductors; and a second pattern disposed on the second surface of the insulating substrate and disposed on the other side of the insulating substrate based on the interlayer connection conductors, and wherein the first magnetic part is disposed to face the second pattern while having the insulating substrate interposed between the first magnetic part and the second pattern.

11. The antenna module of claim 10, wherein the magnetic part includes a cutting part formed in a form of cutting the second magnetic part inwardly from a side surface of the second magnetic part.

12. The antenna module of claim 11, wherein the cutting part is disposed so that at least a portion of the cutting part faces the first antenna wiring.

13. The antenna module of claim 10, wherein the second magnetic part is disposed to partially face the second antenna wiring, and the first magnetic part is disposed to penetrate through the insulating substrate and face a portion of the first antenna wiring.

14. The antenna module of claim 10, wherein the first spiral part and the second spiral part are formed in which spiral directions are opposite directions to each other, or the same direction as each other.

15. The antenna module of claim 10, wherein one of the first spiral part and the second spiral part is disposed in a region between turns of the second antenna wiring.

16. The antenna module of claim 10, wherein at least a portion of the first spiral part faces the first magnetic part, and the second spiral part does not face the first magnetic part, and at least a portion of the second spiral part faces the second magnetic part.

17. The antenna module of claim 10, wherein the first spiral part and the second spiral part are continuously formed by one wiring.

18. The antenna module of claim 10, wherein the first antenna wiring and the second antenna wiring are alternately disposed on the first surface and the second surface of the insulating substrate, respectively.

19. An antenna module comprising:

a coil part including a second antenna wiring formed in a spiral shape on a first surface of an insulating substrate and a first antenna wiring comprising a first pattern disposed on the first surface of the insulating substrate in an internal region of the second antenna wiring and a second pattern disposed on a second surface of the insulating substrate; and a magnetic part including a second magnetic part disposed on the second surface of the insulating substrate and a first magnetic part disposed on the first surface of the insulating substrate in the internal region of the second antenna wiring, wherein the first antenna wiring includes interlayer connection conductors disposed in the insulating substrate, wherein the first pattern is disposed on one side of the insulating substrate based on the interlayer connection conductors and the second pattern is disposed on another side of the insulating substrate based on the interlayer connection conductors, and wherein the first magnetic part is disposed to face the second pattern while having the insulating substrate interposed between the first magnetic part and the second pattern.

* * * * *